United States Patent [19]
Misinai et al.

[11] Patent Number: 5,848,241
[45] Date of Patent: Dec. 8, 1998

[54] RESOURCE SHARING FACILITY FUNCTIONS AS A CONTROLLER FOR SECONDARY STORAGE DEVICE AND IS ACCESSIBLE TO ALL COMPUTERS VIA INTER SYSTEM LINKS

[75] Inventors: Tsvi Misinai, Rechovot; Michael Rotschild, Ramot Hashavim; Shmuel Alazraki, Kiriat Ono; Arie Kremer, Atereth, all of Israel

[73] Assignee: Openframe Corporation Ltd., Kiryat Ono, Israel

[21] Appl. No.: 781,151

[22] Filed: Jan. 9, 1997

Related U.S. Application Data

[60] Provisional application No. 60/010,001 Jan. 11, 1996.
[51] Int. Cl.[6] ............................................. G06F 13/00
[52] U.S. Cl. ............................ 395/200.43; 395/200.47; 711/112; 711/119
[58] Field of Search ................................. 707/205, 201; 395/876, 200.43, 200.47; 711/112, 119

[56] References Cited

U.S. PATENT DOCUMENTS

| | | | |
|---|---|---|---|
| 5,317,739 | 5/1994 | Elko | 395/200.46 |
| 5,331,637 | 7/1994 | Francis | 370/408 |
| 5,339,405 | 8/1994 | Elko | 395/185.09 |
| 5,339,427 | 8/1994 | Elko | 395/673 |
| 5,452,447 | 9/1995 | Nelson et al. | 707/205 |
| 5,452,448 | 9/1995 | Sakuraba et al. | 707/201 |
| 5,490,270 | 2/1996 | Devarakonda et al. | 707/201 |
| 5,732,240 | 3/1998 | Caccavale | 395/876 |
| 5,734,898 | 3/1998 | He | 707/203 |

Primary Examiner—Le Hien Luu
Attorney, Agent, or Firm—Herbert Dubno

[57] ABSTRACT

A method and architecture for sharing data items using a resource sharing facility with a medium level cache accessible to all of the computers which are to share and connected to the computers by fast intersystem links. The resource sharing facility also acts as an ordinary secondary storage controller and in the resource sharing facility the control information and logic is provided which is needed for the mapping of cache data to the secondary storage and vice versa.

31 Claims, 17 Drawing Sheets

RESOURCE SHARING FACILITY FUNCTIONS AS A CONTROLLER FOR SECONDARY STORAGE DEVICE AND IS ACCESSIBLE TO ALL COMPUTERS VIA INTER SYSTEM LINKS

CROSS REFERENCE TO RELATED APPLICATION

This application claims the benefit of and is related to the copending provisional application Ser. No. 60/010,001 filed Jan. 11, 1996 by at least one of the present joint inventors, entitled RESOURCE SHARING FACILITY and contains at least one claim to subject matter disclosed in the provisional application and attributed to at least one of the inventors named therein.

FIELD OF THE INVENTION

Our present invention relates to a method of sharing data items and locks and of supporting remote procedure calls and coordinated process groups between a plurality of computers representing loosely coupled data processing systems that can and do operate independently but can share common resources. The invention also relates to a resource sharing facility which can be used in common by such computers and to a computer architecture embodying same.

The term "computers" as used here is intended to refer to machines having one or more central processing units. The central processing units of one computer can be of the same type as, or of a type different from, the central processing units of another computer. The invention also relates, therefore, to heterogeneous computer systems sharing data which is maintained in the resource sharing facility or in secondary storage, often referred to as secondary storage devices, attached to the resource sharing facility or available in storage or memories elsewhere as managed by the resource sharing facility.

BACKGROUND OF THE INVENTION

In the past, loosely coupled data processing systems often had more than one operating system, each attached to a direct access storage which could contain shared data and which allowed the data to be shared among the processing systems by the use of smart controllers.

Common secondary storage, usually DASD, can be accessed through so-called smart controllers that are connected to several computers, can maintain cache buffers to achieve enhanced performance and can support resource locking to enable coordination of access to data by the multiple computers.

Recently, IBM® introduced a SYSPLEX™ architecture that utilizes a coupling facility maintaining shared data in an active memory. In this architecture, all of the computer systems that share the data maintained in the coupling facility are connected to the coupling facility through very fast coupling links and use a special set of commands to store, change, delete, retrieve, lock and release shared data items. These computer systems are also linked to shared direct access storage through considerably slower channels. Use of a coupling facility of this type in an environment where computer systems do not have to share data, or have very limited sets of reasons to do so (for example where only one computer accesses any particular database or data set) will only cause a degradation in performance.

Those resources that require faster access, like DBMS cache buffers, locks and shared structured lists, can be handled by the aforementioned coupling facility.

Among the drawbacks of the use of a coupling facility of the aforedescribed type is the cache storage management redundancy which can utilize memory space in the controller, in the coupling facility and the computer main storage and can use processor cycles in the computer, in the coupling facility and in the controller. The data access can involve multiple units so that actions like "READ FOR UPDATE" must be separated into "LOCK" requested from and performed by the coupling facility and "REAL READ" requested from and performed by the channel and the controller. Furthermore, the aggregate input/output throughput can be limited by the input/output limitations of the channel which can be significantly lower than that of the link to the coupling facility.

It is an important point of the present invention as detailed below, that replacement of the coupling facility functionality with that of extended controllers of secondary storage devices can often overcome these drawbacks.

OBJECTS OF THE INVENTION

It is the principal object of the present invention, therefore, to provide an improved method of sharing data between homogeneous and/or heterogeneous computer systems which can overcome at least some of these drawbacks.

It is a further object of the invention to optimize access to shared data through the unification of the cache that is shared between the computer systems with the cache maintained by controllers of direct access storage devices.

In general, therefore, it is an object of the invention to provide a computer architecture which facilitates the sharing of secondary storage between a plurality of homogeneous and/or heterogeneous computer systems in an efficient way which will enable sharing of relevant data items between and among the computer systems and between these computer systems and controllers of secondary storage devices.

It is also an object of the invention to enable computer independent load balancing that can also be used in a single computer without degrading performance.

An additional object of the invention is to improve coordination of process groups in multiple computer systems.

A further object is to provide efficient support for remote procedure calls between processes running on such computers.

SUMMARY OF THE INVENTION

These objects and others which will become apparent hereinafter are attained, in accordance with the invention, through the provision of a resource sharing facility that functions as a secondary storage controller optionally including secondary storage devices or, as more generally described below, simply secondary storage, providing support for application sensitive cache buffer management, unification of data related lock requests with corresponding input/output or I/O requests, lock management, load balancing queues and database journal files, the resource sharing facility being connected to the computers or the computer systems by means of high speed intersystem links or channels.

More particularly, the invention is a method of sharing data items and locks and of supporting remote procedure calls and coordinated process groups between a plurality of computers having respective central processing units, respective main storage associated with the central processing units of each computer and potentially high level cache buffers maintained in the main storage of the respective computer.

This method comprises the steps of:
(a) providing a resource sharing facility with a medium level cache and a resource sharing facility database and capable of selectively storing a set of data items in the medium level cache and the resource sharing facility database;
(b) connecting the resource sharing facility to all of the computers by intersystem links so that the resource sharing facility is accessible to all of the computers;
(c) operating the resource sharing facility as a controller for at least one secondary storage;
(d) maintaining in the resource sharing facility control information and logic needed for mapping medium level cache data to the secondary storage and secondary storage data to the medium level cache for each data item in the medium level cache; and
(e) synchronizing cache data maintained in the resource sharing facility and persistent data residing in the secondary storage by delegating input/output operations from the computers to the resource sharing facility.

According to a feature of the invention the method can further comprise the steps of:
activating in the resource sharing facility a set of processes in response to at least one request from a respective manager of at least one of the high-level caches; and
supporting in each process of the set requests from and of the computers
to store a data item in the medium-level cache,
to register interest in a data item,
to write a data item to secondary storage, and
to read a data item from the medium-level cache to each of the high-level caches.

We can, for example, provide each of the computers with a resource sharing facility support facility (RSF-SF) having a cache buffer control vector in the respective main storage with entries describing states of data items in buffers of the respective high-level cache, each of the requests to register interest in a data item associating a respective one of the entries of a respective cache buffer control vector with a corresponding data item in the medium-level cache.

Moreover, upon each writing of any data item from one of the computers into the medium-level cache by a write request, we can invalidate or refresh corresponding copies of the same data item in all of the high-level caches of all of the computers that have registered interest in that data item except for the computer which has issued the write request.

The shared data items can be selected from:
structured data of a database management system data set or database,
structured data of a nondatabase management system data set, and
unstructured data items.

The resource sharing facility database management system can be implemented directly in the resource sharing facility and is operated inter alia for maintenance and use of queues needed for online transaction processing and batch job execution.

As previously noted shared database journal files can be supported in the resource sharing facility and the latter can effect transaction and job load balancing operations sharing computer independent session data and job context data.

The resource sharing facility database management system can also, alternatively or in part, be implemented in at least one of the computers.

The data maintained by the resource sharing facility database management system (RSF-DBMS) can then be stored in the high-level storage of this latter computer and need not be shared between the computers.

An important feature of the invention is that of periodically transmitting a heartbeat message from each of the resource sharing facility support facilities to the resource sharing facility to signal that a respective computer remains active and connected to the resource sharing facility by a respective intersystem link.

The method of the invention can further comprise the steps of:
generating a cross-notification message selectively invalidating a respective high-level cache, refreshing a respective high-level cache and announcing a change in status of a data item associated with the respective high-level cache by the resource sharing facility upon a change to any data item in the medium-level cache; and
sending the cross-notification message to at least some of the computers registering an interest in the respective data item.

Furthermore, we can post with the cross-notification message an event control block that has previously been created by the interest registration in the computer that receives the message.

The structure data itself may be data of an MVS DB2 database,
data of an IMS database,
data of an ADABAS database,
data of a VSAM file,
data of IAM files,
data of a DB2/6000 database,
data of an Oracle database,
data of a Sybase database,
data of an Informix database,
data of an Ingres database,
data of a Microsoft® SQL server database,
data of an SQL/DS database,
data of a CA-IDMS database,
data of a DataCom/DB database, and/or
data of any other DBMS.

The computers which can be used can be IBM® mainframes and compatibles, UNIX machines, NT machines, PCs and compatibles or any other type of computer and/or combinations thereof.

According to a feature of the invention the method also comprises:
reading data items from the medium-level cache with a read request; and
locking data items read from the medium-level cache against concurrent update in and optionally against concurrent read from the medium-level cache with the same read request.

The invention is also a method of reducing a load upon a computing system comprised selectively of at least one general purpose computer and at least one data server and speeding access thereof to data, which comprises the steps of:
(a) delegating input/output operations of structured and nonstructured data of the computer system to a data server maintaining data and logic needed for translation of high-level input/output requests into low-level requests understood by secondary storage provided for the data server, thereby effecting translation of the high-level requests; and (b) operating the computer system at least in part with the low-level requests.

The computer architecture itself comprises:

a plurality of computers having respective central processing units, respective main storage associated with the central processing units of each computer and respective high-level cache buffers maintained in the main storage of the respective computer;

a resource sharing facility with a medium level cache and a resource sharing facility database and capable of selectively storing a set of data items in the medium level cache and the resource sharing facility database; and high-speed intersystem links connecting the resource sharing facility to all of the computers so that the resource sharing facility is accessible to all of the computers, the resource sharing facility being provided as a controller for at least one secondary storage, the resource sharing facility being provided with control information and logic needed for mapping medium level cache data to the secondary storage and secondary storage data to the medium level cache for each data item in the medium level cache, cache data maintained in the resource sharing facility and persistent data residing in the secondary storage being synchronized by delegation of input/output operations from the computers to the resource sharing facility.

The invention thus is able to relax the constraints on the total throughput of secondary storage devices and improve and/or decrease response time through the use of coupling links or any other CPU to CPU fastlink instead of ordinary channels or bus connections for the connection between the computer and the input/output controller, i.e. the RSF, and through the reduction of the number of units involved in access to shared data. With the system of the invention, a set of procedures is used by the programs running on the various computers or computer systems to instruct the RSF regarding the creation and maintenance of the common data items. Database management systems (DBMSS) running in the computers may delegate the reaction to medium level cache misses to the RSF, thereby reducing the number of hardware units involved in input/output operations and the resources needed for the connection between the computer system and these units and off loading some of the complexity from the computer system to the RSF. The exit routines that the RSF should use to perform the translation between the cache data structures and the input/output data structures may be specified by description of a cast-out class of relevant cache-data items. The secondary storage devices, which can be packaged in the same housing with the RSF may treat the RSF as a regular controller.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
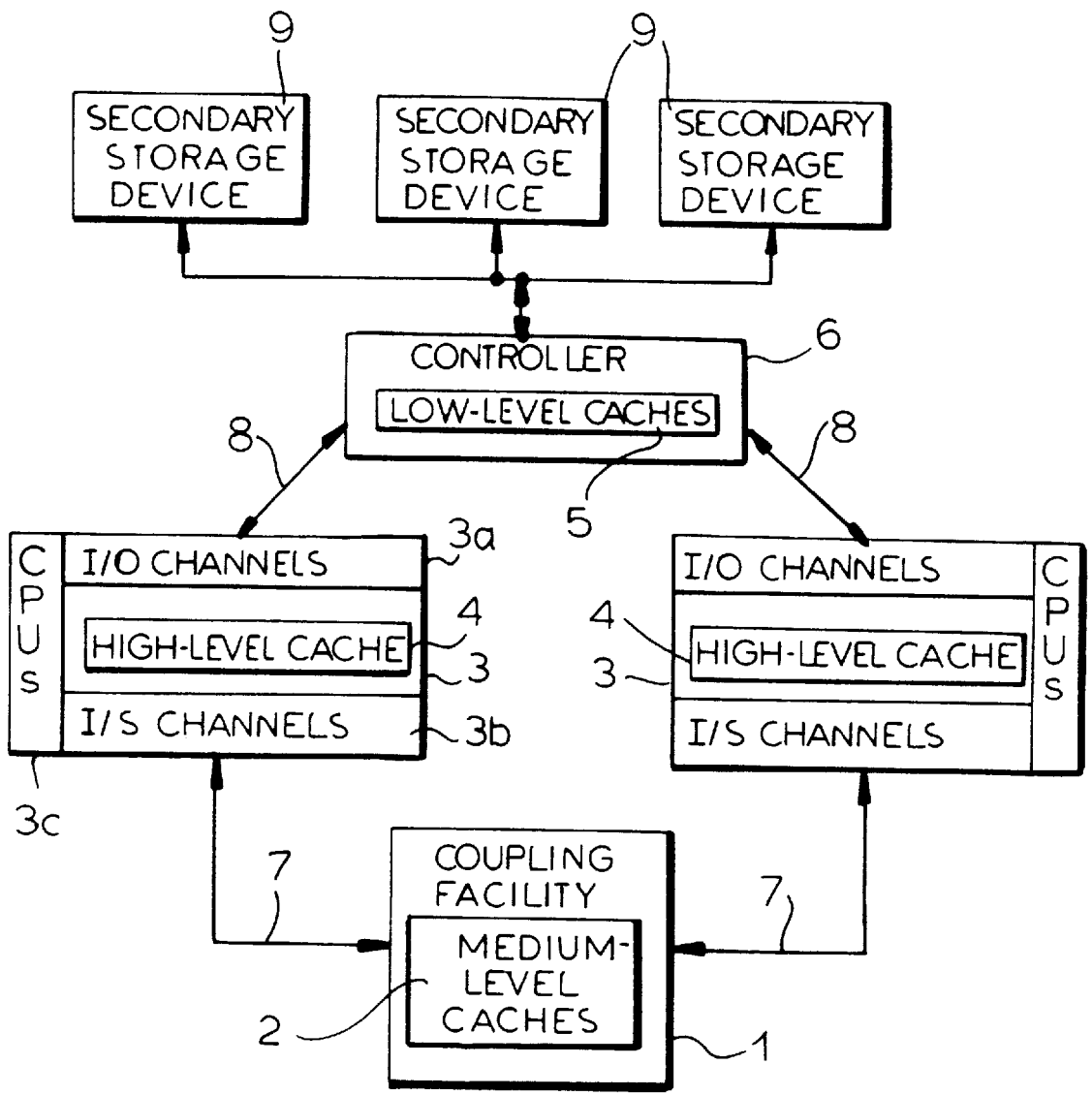
FIG. 1 is a block diagram showing a prior art environment in which a resource sharing facility, according to the invention can be utilized as at least a partial replacement for the coupling facility.

In FIG. 1, we have shown a computer environment in which a number of computer systems or computers represented generally at 3 can share data in a prior art system. In this case, the system uses a coupling facility (CF) forming part of an IBM® SYSPLEX™ architecture as defined, for example, in U. S. Pat. Nos. 5,317,739, 5,331,637, 5,339,405 or 5,339,427. In this system, the coupling facility 1 is used to maintain a multiplicity of medium-level cache buffers 2 that are to be shared between the various computers or computer systems 3. Each of the computers 3 has a local or high-level cache buffer 4 maintained by programs running on the computer and accessible only to these programs. Another set of low-level cache buffers 5 is maintained by the controllers 6 which try to predict, utilizing general statistical rules, which data will most probably be needed repeatedly in order to decide what to keep and what to dispense with.

In this environment when a data item is needed by a program, the computer 3 makes a search for it first in the respective high-level cache. If it is not there an attempt is made to retrieve it through the intersystem (I/S) links 7 from the coupling facility 1. If the coupling facility 1 reports a failure, i.e. issues a failure indication signalling that the data has not been found in the medium level cache 2, the I/O links 8 are used to directly access the data in the secondary storage 9. At this stage another cache 5, namely, the low-level cache of the controller 6, may be checked behind the scenes in order to spare real access to DASD.

When the controller 6 does not find the data in its low-level cache 5 it addresses the secondary storage and draws the data from the secondary storage 9. Having received the data the program may decide that the data should be stored in the medium level cache 2. As a result, another communication takes place between the computer 3 running the program and the coupling facility 1 and the data is transferred over the intersystem link 7 to the medium level cache 2.

Whenever a program needs to write data to both the secondary storage 9 and the medium level cache 2, it performs two separate write operations, one into secondary storage via the I/O links 8 and the I/O channels 3a of the computer and the other into the medium level cache 2 via the I/S links 7 and the i/S channels 3b of the computer 3 whose central processing units are represented at 3c. The second write operation also results in the CF sending a cross invalidation message to all the processors that maintain a copy of that data in their local cache except for the processor that issued the write operation.

The program using the cache in read operations must be aware of the medium level cache misses. The second request that the program issues for the data in a read operation is addressed to the secondary storage controller and uses the relatively slower I/O links as opposed to the request addressed to the coupling facility which uses the I/S links which are normally considerably faster. The optional low-level caches that can be provided in the secondary storage devices have not been displayed since they are immaterial to the present invention.

From the foregoing it will be apparent that the terminology used here may benefit from definition:

Main Storage: Volatile storage residing in the computer system running an application program.

Cache: Volatile storage which can reside in the computer system running an operation, in the resource sharing facility or in a control unit and usually comparatively fast and of substantially smaller size than the secondary storage. Accessing the cache can take at least as long as accessing main storage but not as long as accessing secondary storage.

Secondary Storage: Direct access storage that resides on an external device like a disk. It is not volatile and accessing it generally takes longer than accessing either cache storage or main storage.

Local or High-Level Cache: The type of cache that is closest to the program using the data and normally maintained in the main or high-level storage of the computer that runs the program that uses the cache. The main storage of one computer may be used for several caches.

Medium Level Cache: Cache residing in a central computer, a coupling facility or resource sharing facility for shared use by programs running in the other computers.

Low-Level Cache: Cache that is maintained in the controller or in a secondary storage device. Note that the invention unifies medium level cache with the cache of the controller.

Data Item: A single unit of information that is referred to by a single name in local cache buffers, medium level cache and in permanent storage. It may be a row in a database or a data set (e.g. VSAM) record.

Representative Data Item: A derived data item maintained by triggers in the resource sharing facility database and that represents a whole set of data items in that database. The set of data items represented by a representative data item can be defined through a selection criteria, in structured query language (SQL).

Virtual Representatives: Representative data items which do not really exist in the RSF database and the definition of which only provides a hook for the triggering of cross notification messages.

Cast Out: The process of writing changed data residing in the cache to permanent storage Cast-Out Exit: An RSF routine used to map a data item from the disk data structure to the cache structure and vice versa.

Cast-Out Class: A class assigned to a data item used with cast out processing. Class assignments simplify the cast out process by grouping together data items with similar characteristics. In the resource sharing facility the assignment is also necessary in all cases in which I/O delegation is expected.

Cast Out Class Description: Used to specify the cast out exit.

Cast-Out Instance: A subclass of the cast out class in which the objects all share the information needed by the cast out exit for correct location of the data in secondary storage except for those related to the data item itself, e.g. the boundaries of a data set.

Cast-Out Descriptor: Details about the physical location of a persistent copy of data items belonging to the cast out instance in secondary storage, augmented by the cast-out class and specific parameter values for the cast out exit. (For example, in a description of a cache structure where records of a DB2 database are to be kept, the cast out class could be DB2 tables for an RSF, the cast out instance could specify "EMPLOYEE TABLE IN PERSONNEL DATABASE" and the data item can be "THE ROW DESCRIBING JOHN SMITH.")

I/S Channels: Intersystem channels that prior to this invention were only used in the connection of CPU's to CPU's and not for the connection of CPU's to I/O devices and controllers.

Store-in Cache: A medium level cache where data items are stored in data entries whose output to secondary storage, if performed at all, is not scheduled at the same time as their insertion into the cache or their replacement in the cache.

Store-Through Cache: a medium level cache where data items are stored in data entries and are scheduled for output to secondary storage with the same serialization.

Control-Only Cache: A medium level cache maintaining only control entries to help control local cache buffers.

Local Cache State: The state of a local cache buffer. For example, a local cache buffer, containing a data item, may be invalid or valid. It is considered valid if there is no younger version of the same data item in the medium level cache or in secondary storage; it is invalid otherwise.

Resource Sharing Facility Support Facility: A process, which can use its own processor in the computer, that reacts to messages arriving from the resource sharing facility notifying of changes for the state of local cache buffers resulting from changes in the medium level cache and communicates relevant process status changes to the resource sharing facility.

Heartbeat: A message sent by the RSF support facility of a computer to the RSF indicating that the computer is still working. Heartbeat massages are sent by the RSF support facility periodically. The length of the period is configurable.

State of a Data Item: The state of the data item has two values which can be interpreted as valid or invalid but can be interpreted in any other way depending on the way the data item is used.

Cache Buffer Control Vector: A vector maintained by the resource sharing facility support facility in the main storage of each of the connected computers where every entry describes the state of one data item in local cache buffers and optionally points to a buffer of the data item in the local cache.

Invalidation: Invalidation of a local cache buffer is the setting of the entry representing this buffer in the cache buffer control vector (CBCV) to represent an invalid state.

Posting a CBCV Entry: Posting a CBCV entry means changing its state.

Registering Interest in a Data Item: Registering interest in a data item is the creation of an association between an entry in the CBCV, a data item contained in a local cache buffer, and a copy of that data item in the medium level cache buffer. Such a registration may also include the operation of insertion of the address of this local cache buffer into the entry in the CBCV and/or using a CBCV entry umber to point from the medium level cache to the entry in the CBCV.

The resource sharing facility maintains for every cashed data item in the medium level cache a set of interest registered processes. This set is optionally maintained in an RSF database (RSF DB). Registrations may also be grouped through a parameter in the registration request. A registration request with a group attribute may also be given a priority. Indirect users of a local cash buffer will generally not register interest in a particular data item. Only the processes that manage the local cache like a DBMS server will register interest in the data item.

Interest Group: A set of interest registrations with the same group attribute. Interest registrations in a group are ordered by priority and time of arrival. Interest registrations which have not been given a group identifier attribute are viewed each as forming its own interest group which may be a singleton. Interest groups provide a simple way of creating service provider queues. The resource sharing facility supports interest groups through a cross invalidation/notification mechanism.

Cross Invalidation Message: A message sent by the RSF to an RSF Support Facility, informing it about a local cache buffer containing one of its registered data items that has become invalid.

Cross Notification Message: A message sent by the resource sharing facility to an RSF support facility informing it about a change of state of a representative data item and, optionally, containing data that is to be stored in the buffer pointed to by the relevant CBCV entry.

Cross Refresh Message: A cross notification message containing data to be stored in the area pointed to by the CBCV.

Context Information: Information a computer needs in order to resume processing of a session, transaction or job.

Resource Sharing Facility Database (RSF DB): A simple form of database, preferably supported internally by the RSF and/or on the connected computers implementing an interface such as SQL or a subset thereof, supporting triggers, which can be augmented with the capacity of sending cross notification messages from its triggers. RSF databases may be used to maintain the input queues of a TP monitor. In this case, all of the TP monitor's transaction processing processes (TPPs) may register interest in a data item (maintained by triggers) that signals whether the last update to the queue caused it to change state from empty to not empty. Job queues and session contexts are another possible application of the RSF database. Supporting the RSF database through the RSF improves performance in cases in which the RSF database is truly shared by several computers. Support of the RSF database on the computers enables programs that use it to achieve better performance when they are run on a single computer. Both the RSF and the computers can therefore provide support for RSF databases.

Database Journal: A data set used by a DBMS to record information needed for transaction auditing and database recovery. When a database is shared between several computers this data set must be shared as well. Database journals can be implemented as tables in RSF databases or a special support for shared database journals can be provided in the resource sharing facility.

Event Control Block (ECB): A block used by processes that issue asynchronous requests to monitor the termination of these requests.

Wait for Input: An instruction to a process to wait for a CBCV entry to be posted, using the WAIT command. It may also wait for any given set of CBCV entries or even for any combination of CBCV entries and ECB's.

Load Balancing: Load balancing describes sharing of the processing load between several computers and/or processors and/or processes while optimizing overall throughput and response time. Where load balancing is to take place a queue (client queue) of the elements creating the load (sessions, transactions or jobs) and a queue (server queue) of service providers (computers, processors, processes or tasks) may be used. The resource sharing facility database implements such queues and the behavior of interest groups is defined particularly for the server queues. In the case of a TP monitor, the server queues are queues of the TPP's of the TP monitor and the client queues are input queues for the TP monitor. A decision is made for every input as to the instance out of the TP monitor's TPP's that will handle it.

Remote Procedure Call (RPC): calling a procedure that resides on one computer from a procedure that runs on another.

Coordinated Process Group (CPG): A group of processes with a given name that share status information. A single process can belong to several coordinated process groups. Coordinated process groups are particularly useful in the creation of fault-tolerant applications where predesignated processes must take over when others fail.

Local lock: A lock whose scope is limited within a single computer.

Global lock: A lock whose scope is the whole set of heterogeneous and/or homogeneous computers.

Figure 2:
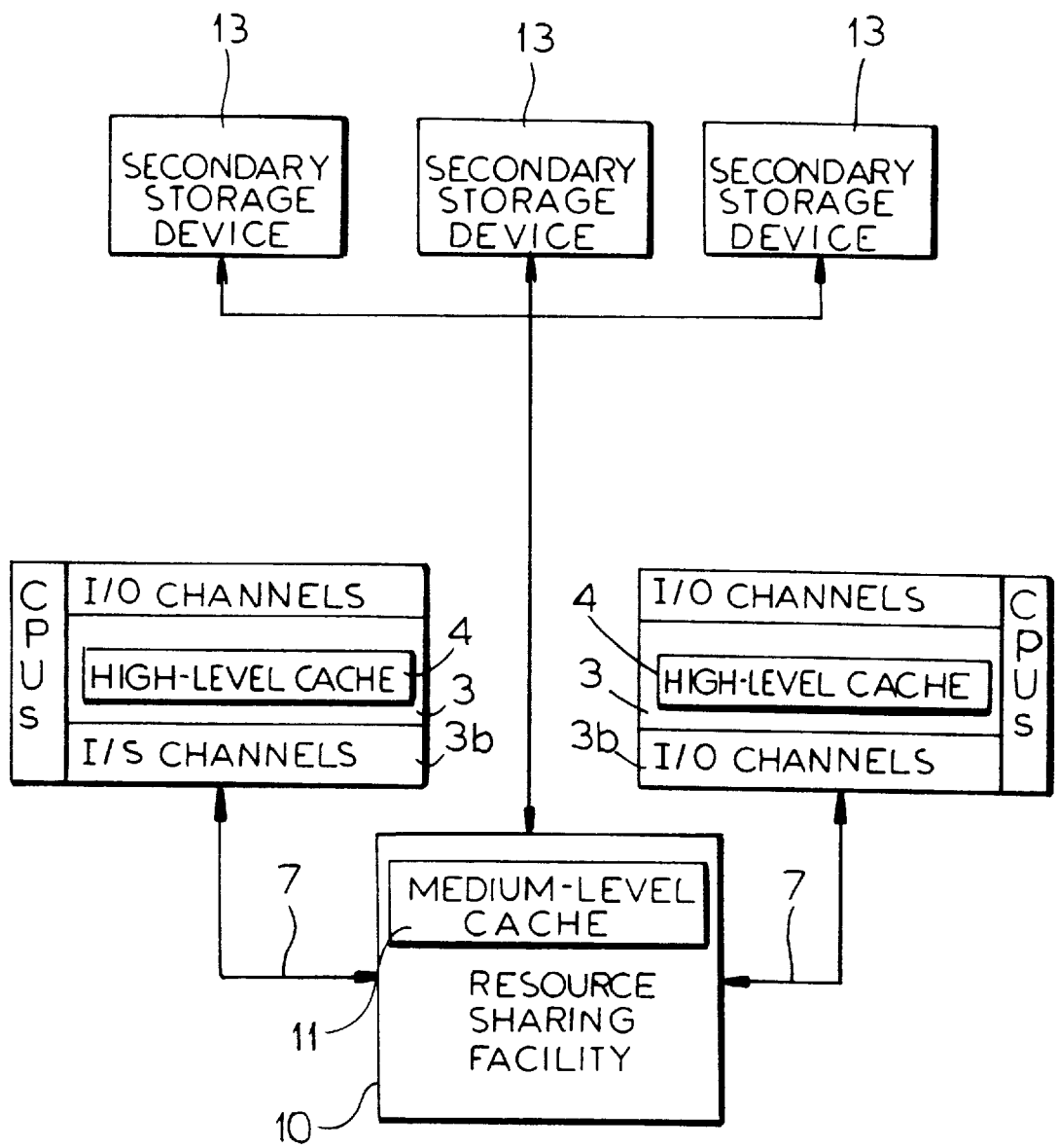
FIG. 2 is a diagram similar to FIG. 1 illustrating the use of the resource sharing facility of the present invention.

FIG. 2 is a diagram of essentially the same environment as FIG. 1 but implementing the present invention, i.e. with the computers or computer systems 3 and the I/O devices sharing data through the resource sharing facility 10 with its medium-level cache 11. Controllers may still be attached to the I/O channels to enable access to devices which are not attached to the resource sharing facility but neither these controllers nor such other devices have been shown in FIG. 2. The important point here is that the coupling facility and controller for the secondary storage devices 13 have been replaced by the resource sharing facility 10 and the secondary storage devices 13 are directly attached to the RSF 10 which is therefore able to access the secondary storage 13. Indeed, the secondary storage 13 may be incorporated in the RSF 10, i.e. may be housed in the same package as the RSF 10.

The medium level caches 11 are those maintained by the RSF 10 and the secondary storage devices 13 may, as has been described, still contain the low-level caches which are not shown here.

These changes in the architecture to that of the invention from the architecture of FIG. 1 are reflected both in the way programs running on the computer 3 manage their own data requests and the support given to these requests primarily by the resource sharing facility. When the invention is used to its full potential, programs need never call upon two components of the environment in order to support a single operation on the data since every access (read or write request) to the medium level cache 11 will generate the proper I/O request to the secondary storage devices 13. In write requests, such an I/O operation always takes place, whether immediately following the write to the medium level cache or postponed. With read requests the I/O operation is needed only when the data has not been found in the medium level cache. The program does not have to devote flow of control for the generation of the I/O request since that has been delegated to the RSF 10 nor does the program need a separate stage for update of the medium level cache 11 of the RSF 10 (as part of a read from secondary storage or a write to secondary storage) since this update is performed, when needed, by the RSF 10 as part of its response to the request. Copies of data items that have been written into the medium level cache and possibly into secondary storage, that are maintained in local caches of the computers other than the computer that initiated the current write request are invalidated or refreshed as part of the write operation provided that interest in these data items has been registered by these computers with no group identification.

Cross notification messages are also sent to one representative of each interest group (the earliest registration with the highest priority) as part of the (optionally derived) operation that writes the data item that is the subject of interest in that interest group to the medium level cache.

Different formulations of the request and different definitions of the data items can influence the way the resource sharing facility handles the various write requests. Some of the data items are immediately scheduled for cast out. Other data items are not copied directly to secondary storage but remain in the cache 11 until some process requests cast out. Others remain in the cache 11 until an explicit request for removal is executed.

Load balancing as described is implemented by storing session context blocks and input queue records belonging to the TP monitors in RSF databases. New records of a DBMS journal file can be appended to its end from all of the computers connected to the RSF utilizing the support that the RSF provides for shared journal management. The net I/O rate is thus not bound by the speed of the relatively slow I/O channels and links since much of the data is transmitted via the I/S links 7 and the I/S channels 3b.

Actions like "read for update" are formulated as a single request since both the locking and the I/O are performed by the same machine through the same IS channel. In this case the RSF 10 of FIG. 2 replaces the CF 1 of FIG. 1 which handles lock requests.

In this architecture, some of the load usually handled by I/O channels is transferred to the IS channels and in order to take full advantage the number of IS channels may have to be increased while the number of I/O channels can be decreased.

Figure 3A:
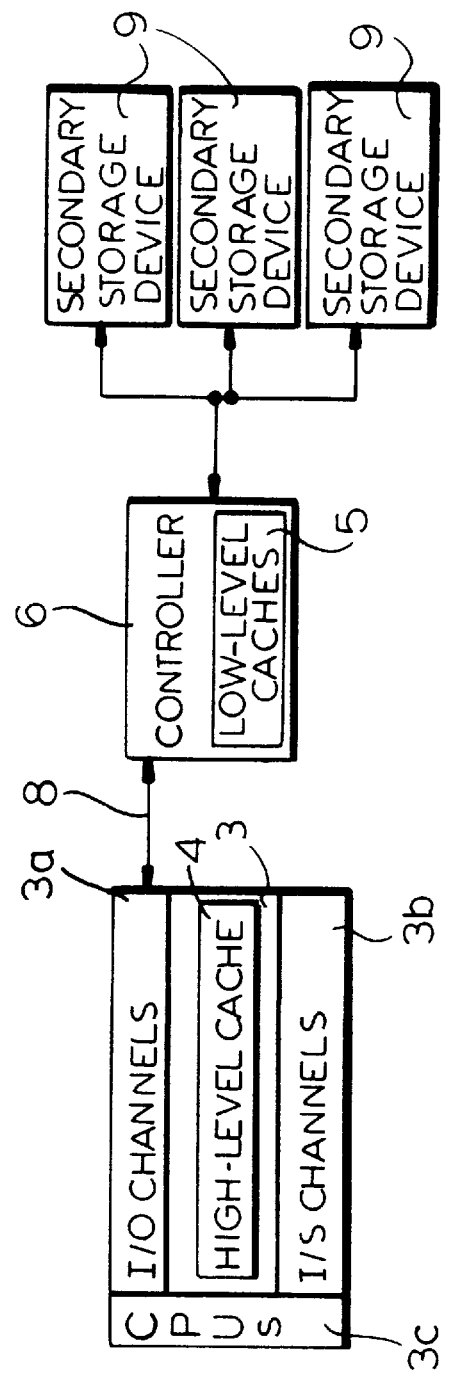
FIG. 3a is a block diagram of a prior art system in which the controller can be replaced by a resource sharing facility of the present invention.

FIG. 3a illustrates a system in which a controller 6 is provided between a computer or computer system 3 and secondary storage devices 9. In accordance with this system, the computer 3 is attached to the controller 6 through its input/output channels 3a, the computer 3 having the high-level cache 4 and the CPU's 3c previously described. The connection here is through relatively slow I/O links 8. The controller 6 is connected on its opposite side to the secondary storage devices 9.

In this environment data sharing between different computers is obviously not needed and the local cache buffers 4 can be used for speeding input/output operations and for the sharing of data between programs running on the single computer.

Figure 3B:
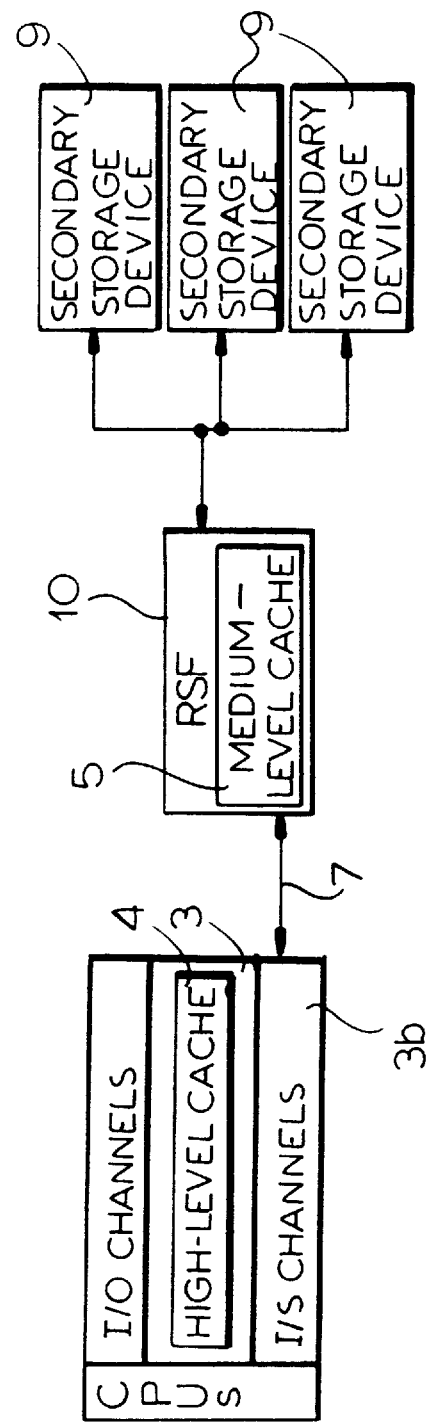
FIG. 3b is a diagram similar to FIG. 3a illustrating the use of the resource sharing facility.

By replacing the controller 6 with the resource sharing facility 10 as shown in FIG. 3b, high speed IS links 7 can connect the RSF to the I/S channels 3b of the computer 3. The resource sharing facility 10 has the medium level cache 5 previously described. The main RSF feature used here is the ability to connect to the fast links between the computer and the RSF which is effectively a controller. Here the RSF does not replace a CF since the CF has nothing to contribute in this case.

Figure 4A:
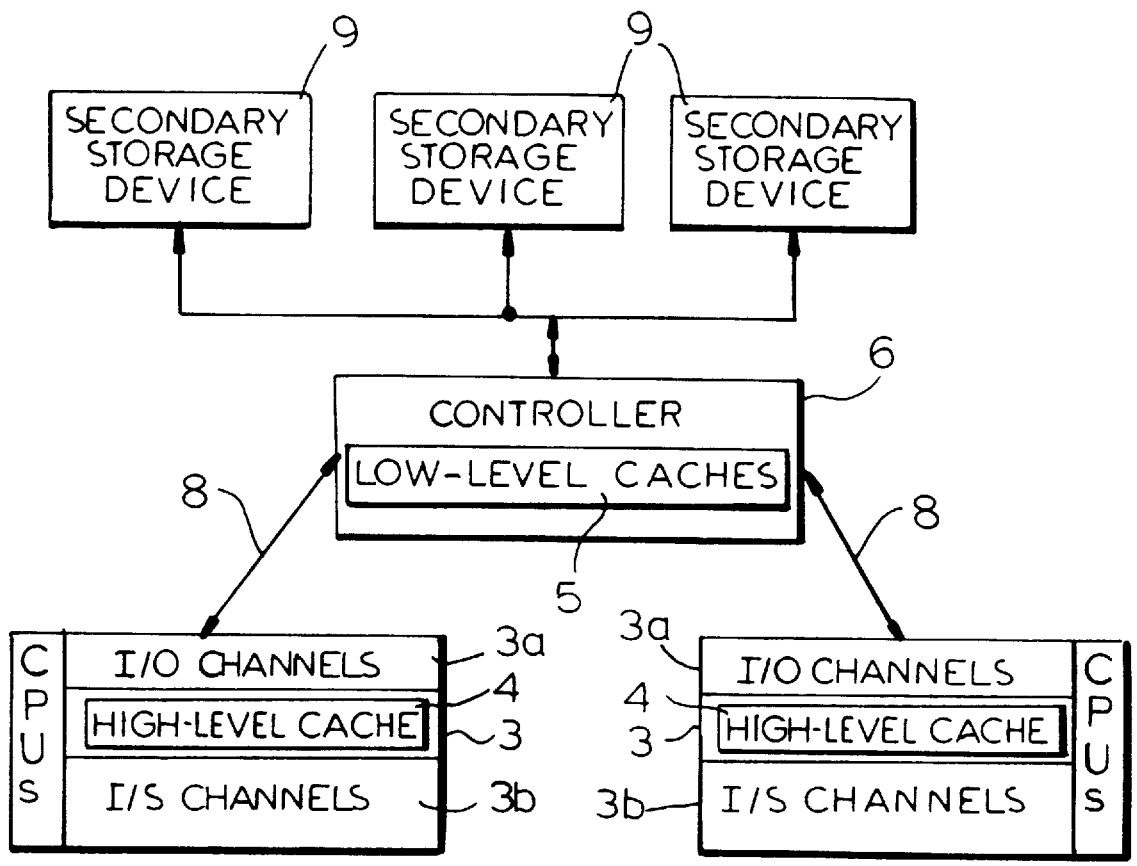
FIG. 4a is a diagram of still another prior art system which can benefit from a resource sharing facility.

FIG. 4a shows an architecture or environment in which two computers 3 have a controller 6 in common and which is analogous to the system of FIG. 1 without the use of a coupling facility. Here each computer 3 has access to its own set of databases that reside in the shared secondary storage devices through the shared controller 6 with its low-level caches 5.

The shared controller 6 is connected to the I/O channels 3a of the computers 3 via I/O links 8. If there are periods in which one of the computers 3 is overloaded and the other has unused resources, this other computer can and should be used to manage some of the load. However in this configuration such load sharing is not possible.

Introduction of a coupling facility as in FIG. 1 would enable data sharing and hence load sharing and balancing, but at the price of a need to communicate with an additional unit (the coupling facility) that contains the locks and the medium level cache buffers. To enable load sharing when needed this price must be paid even when no load sharing is necessary.

Figure 4B:
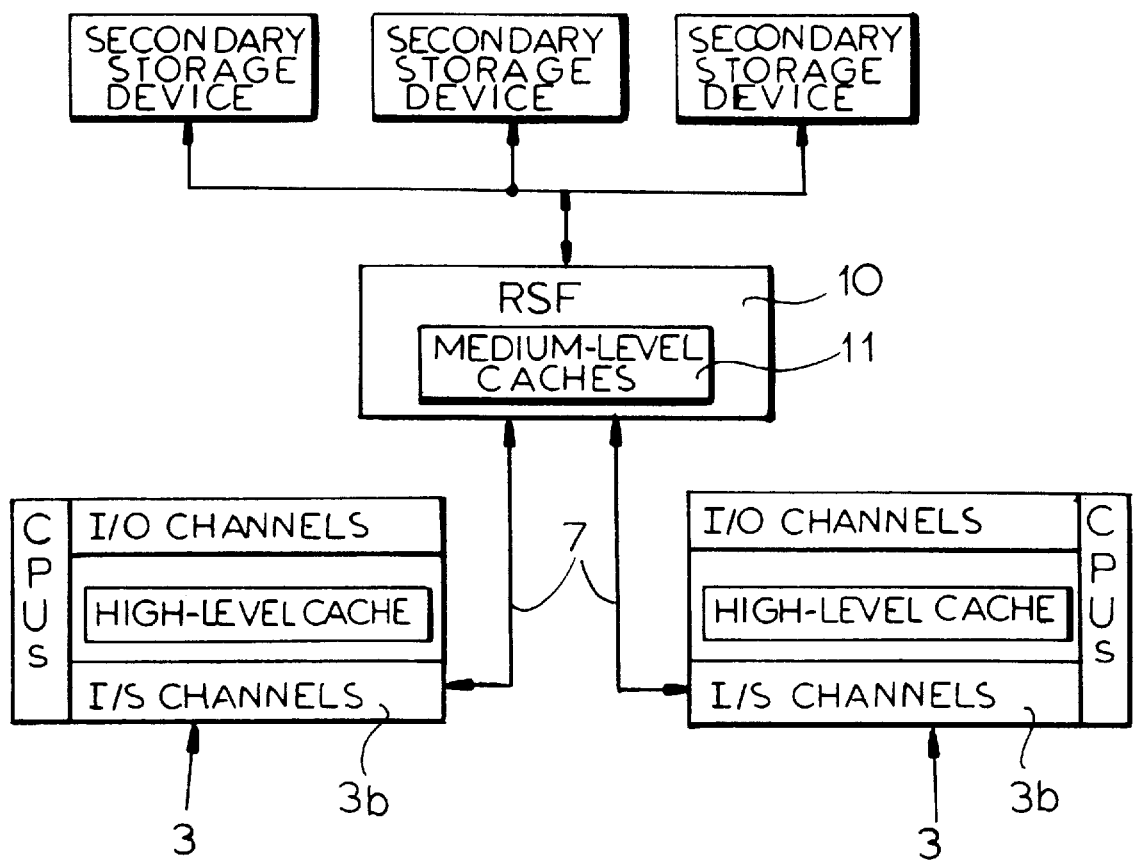
FIG. 4b is a block diagram sharing the replacement of the controller of FIG. 4a by a resource sharing facility.

Where, however, an RSF 10 is used with its medium level cache 11 and communicates with the computers 3 via the IS channels 3b and the IS links 7, the RSF replaces the controller, supports data sharing and load sharing and balancing and reduces I/O response time utilizing the medium level cache without ever creating additional load. In that case, the system is entirely equivalent to that shown in FIG. 2. Compare also FIGS. 4a and 4b.

Figure 5:
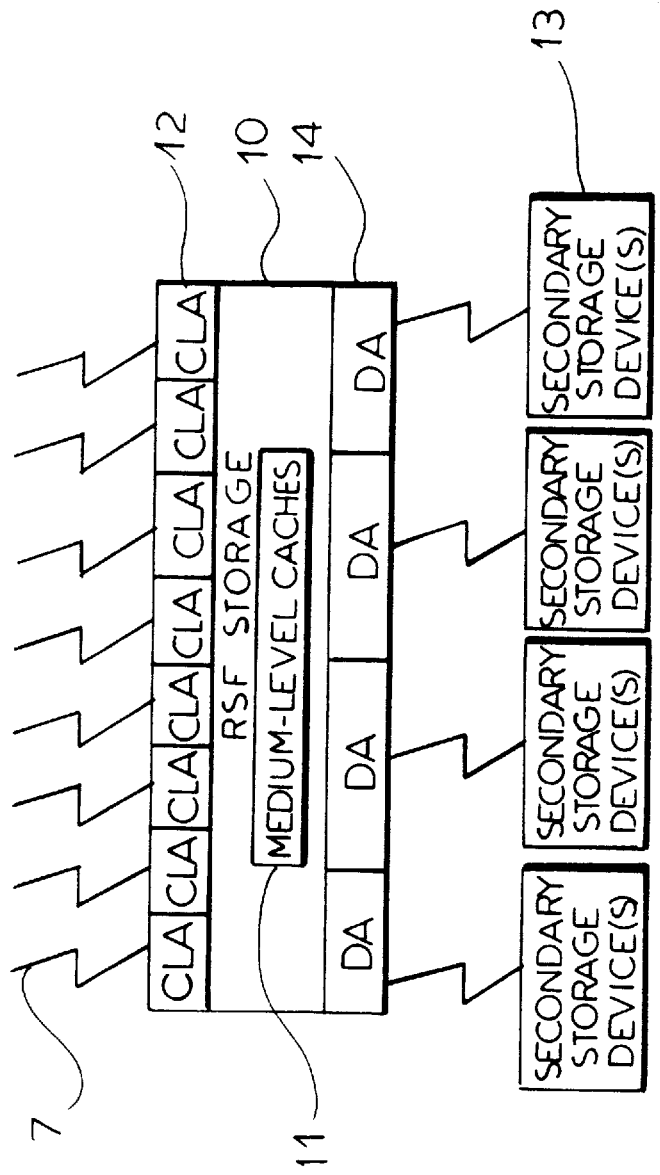
FIG. 5 is a diagram of a resource sharing facility according to the invention.

FIG. 5 shows a possible embodiment of the resource sharing facility which can comprise a multiplicity of coupling link adapters 12 which are dedicated to the I/S links 7 and which are further dedicated to specific computers. Each coupling link adapter (CLA) 12 performs all of the functions of the resource sharing facility described on the RSF side in FIG. 8. Since, as has been described in connection with FIG. 2 and will be even more apparent from FIG. 8, every CLA must be able to communicate with every computer, data areas are provided in the resource sharing facility for communication between the CLA's. The disk adapters are represented at 14 for the resource sharing facility 10 of FIG. 5 and the medium level caches are represented at 11.

Figure 6:
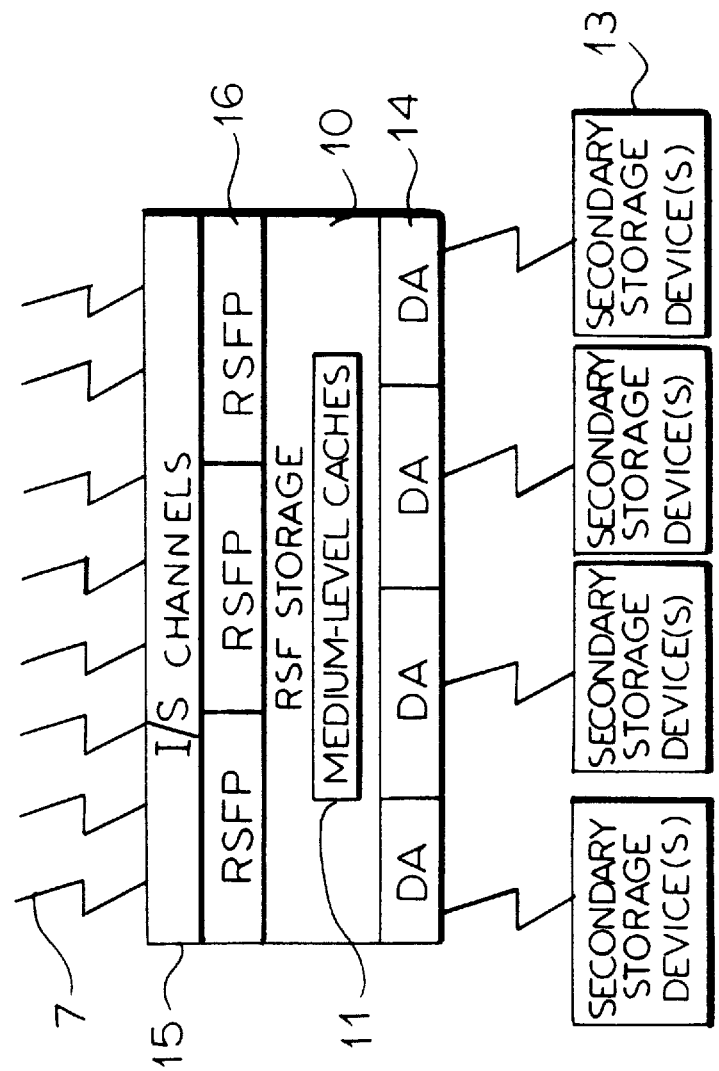
FIG. 6 is a block diagram of another embodiment of the resource sharing facility.

FIG. 6 shows possible construction of the resource sharing facility 10 and here the structure is generally similar to that of FIG. 5 except that the channels to the I/S links 15 and therefore the I/S links themselves are shared between RSFP's which are very similar to the CLA's of FIG. 5 but do not observe a one to one relationship with the I/S links. The I/S channels manage the range of communication with the computers but the logic is the responsibility of the RSFPs. The RSFP's are represented at 16 in FIG. 6.

Figure 7:
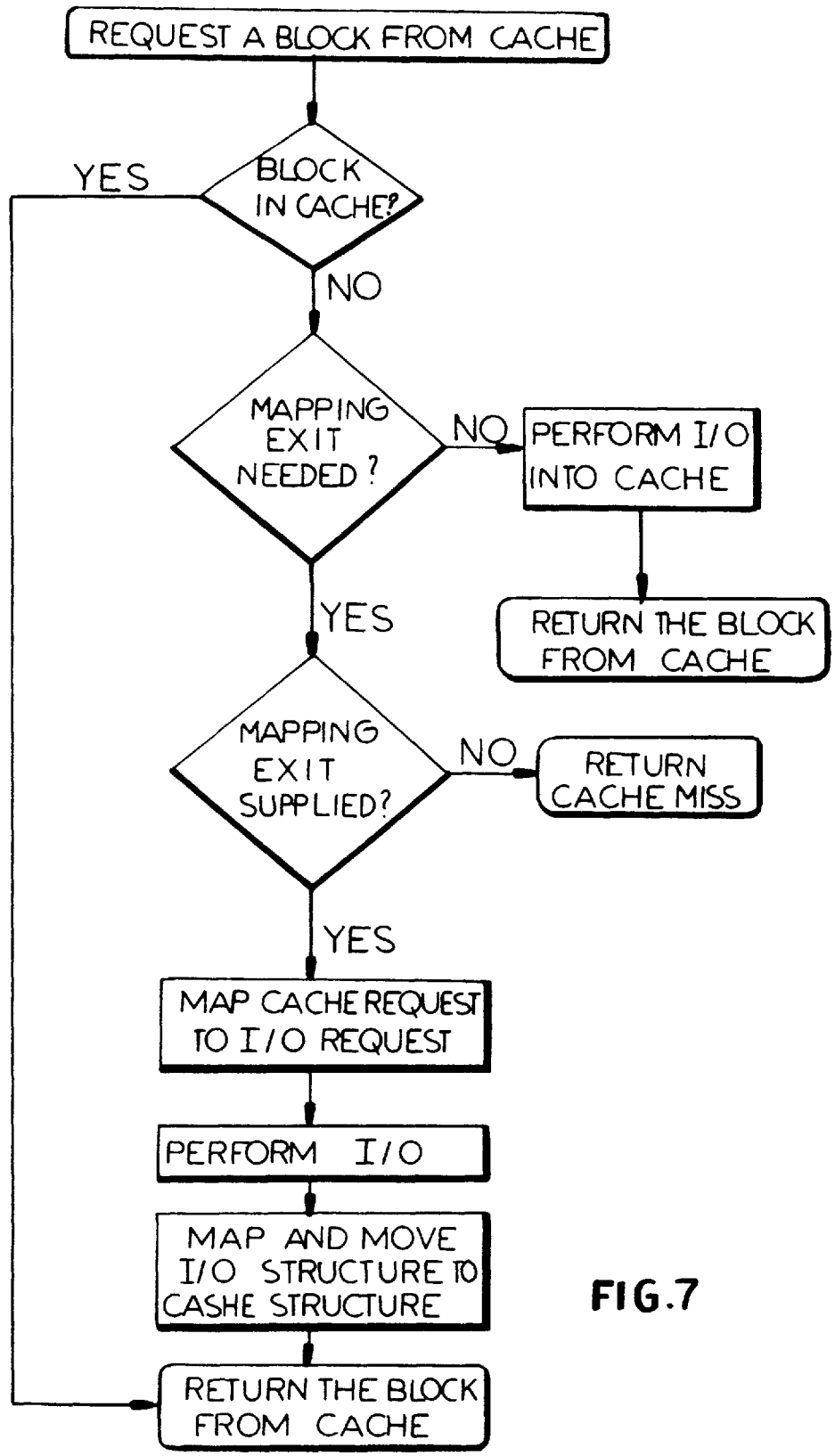
FIG. 7 is an algorithm diagram of the handling of cache read processes in the resource sharing facility, i.e. a description of the flow that is triggered by a request for data from the cache.

FIG. 7 shows an algorithm for processing a request for a block of data in a resource sharing facility 10. If the data is found in the medium level cache 11, it is returned to the requesting program and needs no further processing. If, however, the data has not been found in the medium level cache 11, the RSF 10 does not give up. If all of the necessary details have been provided in the definition of the cast out class, it tries to bring up the data from secondary storage.

FIG. 7 does not show how a new cache buffer is allocated with respect to the medium level cache since there are many ways to do it. At an appropriate point in the process, serialization prevents any single buffer from being allocated to two different purposes.

Cache buffers in the medium-level cache 11 do not necessarily have the same form as the data supplied to the routines that write their equivalents to the secondary storage or the data received from the routines that read their equivalents from secondary storage. As a minimum, details about the physical location of the data and the method used for its organization, which are usually included in or pointed to by the DCB/ACB (a term which in the main frame computer environment stands for the Data set Control Block/Access Control Block) and their associated control blocks, must be supplied to the RSF 10 in order for the RSF 10 to be able to read and write the data correctly. Generally these details may be supplied in a parametric form relying on the fixed internal routines of the RSF to use these details in a predetermined way. In some cases, however, mapping between the cache buffers and the data in secondary storage does not conform to any predetermined specification. In these cases, a special mapping routine may be provided to enable delegation of the I/O to the resource sharing facility. In some cases it is justified to create a partial version of existing access method routines which can include translation data and logic like VSAM indexes and index search and maintenance routines.

Preferably, however, the parameters and exit routines need not be supplied in every access to a detailed writer. These details are included in a cast out instance description in a cast out instance that this data item belongs to.

Referring again to FIG. 7, in order to bring the data from secondary storage, first the RSF verifies whether a mapping routine is needed. When the mapping is a standard one, no such routine is needed since the RSF can perform the mapping using one of its internal routines and relying on the control information given in the descriptions of the cast-out class and cast-out instance. The RSF reads the data, updates the medium-level cache buffers 11 and returns the results to the calling program.

When a mapping routine is needed the RSF 10 checks whether it has been supplied. If not, no I/O delegation can take place and an indication of cache miss is returned. If a mapping routine has been provided, this routine is invoked in order to perform the necessary mapping; first the cache request is mapped into an equivalent I/O request, then the I/O is performed and then the results of the I/O operation are mapped into an appropriate structure and moved into the cache if requested. At that stage, the result is returned to the calling program.

From the calling program's perspective, a read from the RSF may take longer to complete when the data item is not in cache. RSF requests can, therefore, be asynchronous, enabling the caller to deal with other aspects of its task, while waiting for the read request to complete (dealing with read requests that do not complete immediately is imperative in programs that read and lock in the same request, since locks may not always be granted immediately).

Thus an RSF may replace IBM's Coupling Facility with no changes to the programs that use it. However, in order to benefit from the real potential of the RSF, some changes to the programs may still be needed. In order to minimize these changes, a special formulation of the lock request is provided. This special formulation enables the program to tell the RSF that the current lock request will be followed by a read for a given data item. When RSF encounters such a request it tries to improve the chances that the read request will find the record in the medium-level cache. To do so, the RSF responds to the user as in a normal lock request, but continues, behind the scene, to read the data from secondary storage, when the lock has been granted.

Meanwhile, until the record is in the medium level cache, attempts to read it will be delayed. Programs written for the RSF will generally not need this feature since they can issue a combined (synchronous or asynchronous) read with lock.

Figure 8:
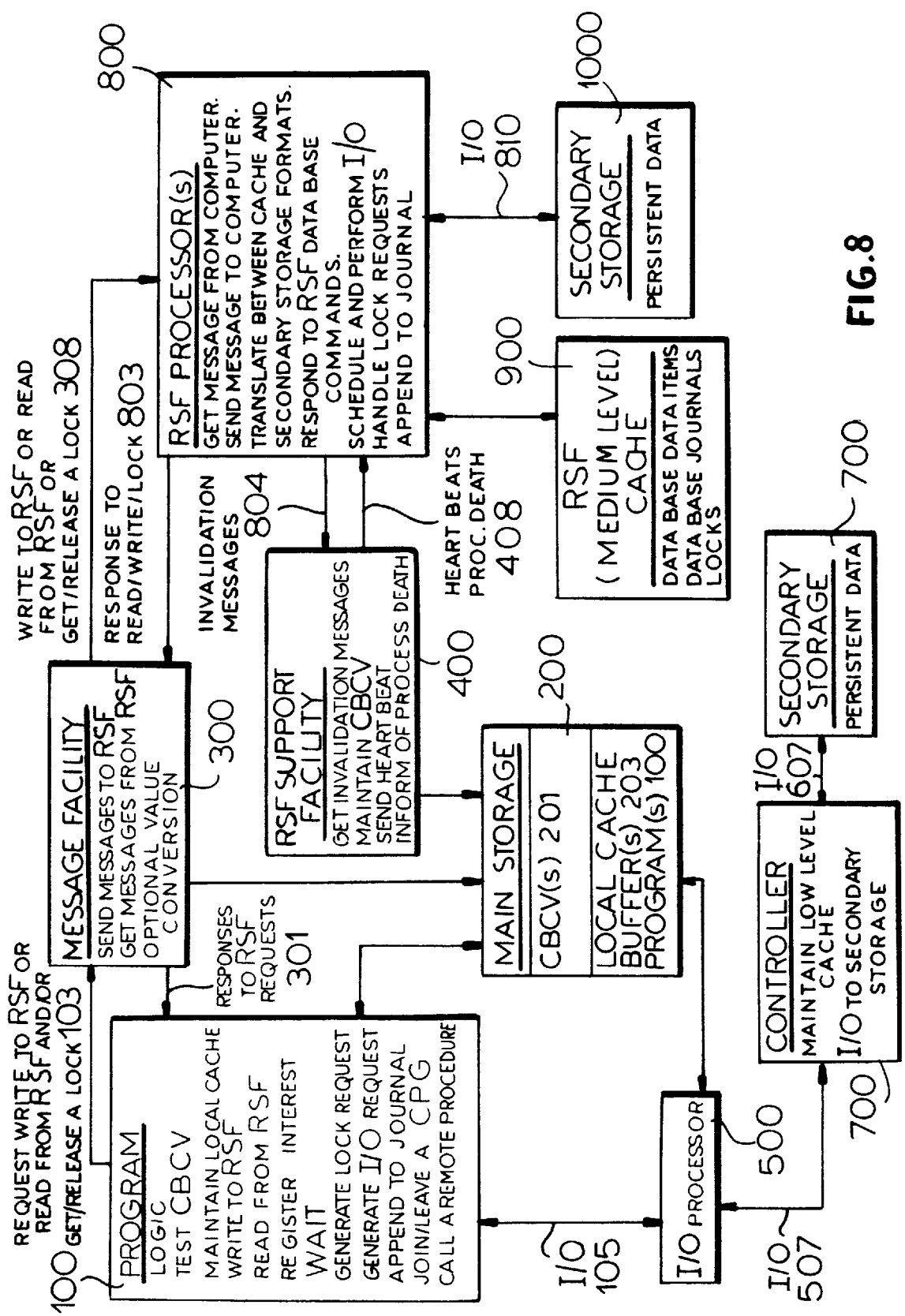
FIG. 8 is a diagram illustrating the principles of data flow in a system according to the invention.

FIG. 8 provides an overview of the logical components of an environment containing one computer and one RSF.

The program 100, the Message Facility 300, the RSF Support Facility 400, the I/O processor 500 and the main storage 200 are all part of the computer. The RSF Processor 800 and the RSF storage 900 are parts of the RSF. Secondary storage 1000 may be part of the RSF but it may also be a separate unit (connected to the RSF). The message Facility 300, the I/O processor 500 and the RSF Support Facility 400 may have a dedicated processor each, but they may also be implemented as processes that share a smaller number of processors and some or even all of them may share the same processor that runs the program 100 or any other program in the computer.

All processes running in a computer share the main storage 200. Messages addressed from one of these processes to another, generally contain pointers to data residing in the main storage.

RSF databases, while normally implemented by the RSF, may also be implemented in the following additional ways:

(a) The data is kept in the RSF but the DBMS resides on all the sharing computers.
(b) The data and the DBMS are in the main storage of one specific computer.
(c) The data is kept both in the RSF and the main storage of the sharing computers and the DBMS runs on all sharing computers.
(d) The data resides both in the main storage of the sharing computers and in the RSF and the DBMS is implemented in the RSF and in the sharing computers.

The program 100 may issue, besides the regular CPU and I/O commands, the following set of commands that use or manage the RSF:

Dirty read (from RSF)

Clean read (Read from RSF with shared lock)

Read for update (Read from RSF with exclusive lock)

Write (to RSF)

Lock

Unlock

Test CBCV

WAIT

RSF database manipulation commands

Journal I/O append (add a record to its end) and read

Join a coordinated process group

Leave a coordinated process group

RPC

The regular I/O commands that the program issues can be addressed to a regular controller or to the RSF, depending on the way the relevant secondary storage is connected to the computer.

These regular I/O instructions are not used for access to the databases and data sets that are shared between several computers through the combination of RSF's medium level cache and I/O capabilities.

One of the duties of the RSF Support Facility 400 is to detect the death of a process in order to inform the RSF that all its locks and all its interest registrations have to be removed.

One way of doing it is the following:

On any lock or registration request, the program process acquires (implicitly), if not yet owned, exclusive control of a unique (like the process id) local lock (supported by the operating system that will be used by the RSF Support Facility to detect its death. The RSF Support Facility, on its part, constantly tries to get shared control of this lock (possibly, through a sub task that waits on an ECB that is posted when the lock is released).

When shared control has been acquired by the RSF Support Facility, it knows that the process has died and the appropriate actions are taken (cleaning internal tables and informing RSF).

The RSF Support Facility 400's command set includes:

Invalidate/Change state/Post

Refresh

Inform RSF of the death of a process

Send heart beat message

When the RSF Support Facility fails to send heart beat messages for a given (configurable) amount of time, the RSF assumes that the relevant computer and all its processes have died.

On process death the RSF 800 initiates a rollback of all the open transactions of this process, frees the locks it was holding when the rollback is completed, erases its interest registrations and, possibly, sends notifications to the members of all coordinated process groups that contained it.

Value conversion is the process of conversion of the representation of values between their representation in the RSF and their representation in the various computers. It appears in this drawing as a task of the message facility but it may also be implemented by the program itself or, less preferably, by the RSF.

An interest registration request may be sent by a program 100 to the RSF 800 as part of a read or write request. When reading a data item form an RSF database, interest may also be registered for another data item; the idea here is to enable a process that is interested in a set of data items in the RSF database to monitor the whole set through a registration of interest in a single data item that is changed (through the database triggering mechanism) upon every interesting change in the set. When properly formulated, a combined request to the RSF may have the following semantics: "try to read an element that satisfies selection criteria <s>; if none exists, register interest for data item <r>". Tiggers are expected to update data item <r> whenever a new data item satisfies <s>.

<r> is the data item that was defined as the (possibly Virtual) Representative data item of <s>.

When a data item is changed, cross invalidation/notification messages are automatically generated by the RSF. Invalidation or refresh messages are sent to all the computers that have registered interest in that data item with no group parameter, while notification messages are sent to one process in every interest group for that data item. The process that is selected in each interest group is the one registered with the earliest time with the highest priority.

Refresh messages will generally contain the data item whose change caused their creation. If the data item that causes the refresh message is a virtual representative, the content of the message is determined by triggers.

Note that only the processes that manage local cache buffers (like DBMSs) will generally register interest in a data item. Indirect users (like these of a DBMS) will rely on the interest registration of the DBMS.

When a cross invalidation/notification message is sent by the RSF, the corresponding registration of interest is cancelled.

Figure 9:
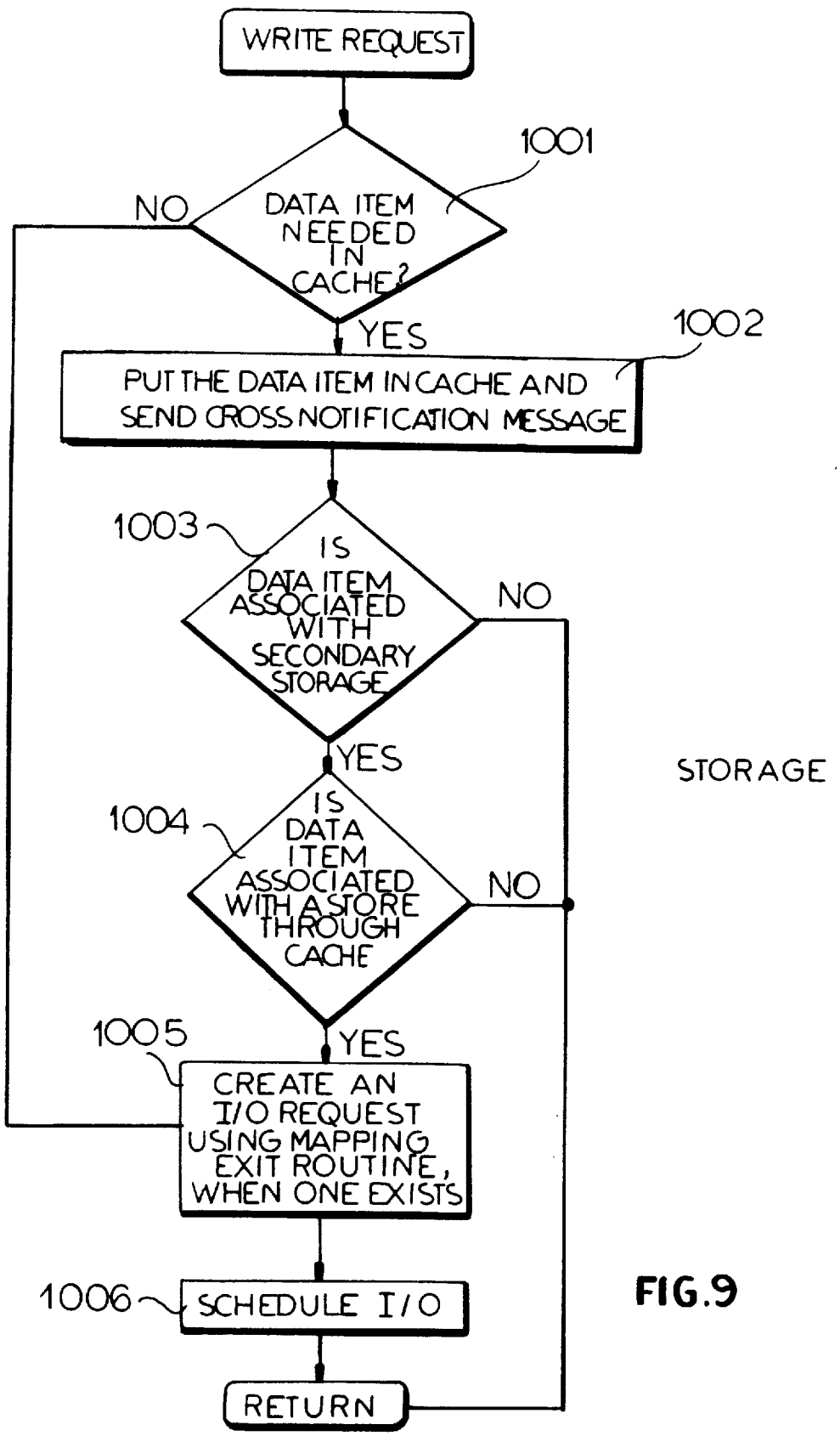
FIG. 9 is an algorithm for the handling of cache write requests in the resource sharing facility.

In FIG. 9 a flow chart is presented to describe the way cache write requests are handled by the RSF.

Since the RSF serves also as a regular controller, not every write addressed to it affects the medium level cache. This is why the first thing that is verified at 1001 is whether the current write command addresses the cache; if not, an I/O request is created at 1005 and scheduled for execution at 1006. The write operation is guaranteed at that stage but its actual execution may be postponed in order to improve performance (RSF uses a battery backup to complete the execution of scheduled I/O requests in the case of power failure); RSF also guarantees that any attempt to read the data, even an attempt that is scheduled before the actual write to secondary storage, will find it.

If the data item is needed in the medium level cache, all of its copies residing in local caches of programs that have registered interest in it with no group identifier, have to be invalidated. This is done in 1002. At this stage, a notification message is also sent to a representative with the highest priority and earliest time in each interest group (refer to FIG. 10 for a description of the table structure that supports this activity). Interest registration of all the computers that have been sent an invalidation/notification message is removed.

Not every data item residing in the RSF has to be associated with secondary storage. The test 1003 verifies that if the data item is not associated with a file, execution of the current request has been completed.

Data items residing in the medium level cache may be store-in data items. If such a data item is associated with a file, the I/O operation copying it to secondary storage is not scheduled as part of the request that writes it to the medium level cache. When such a case is identified 1004 no I/O is scheduled.

When a store-through data item, associated with a file is identified, an I/O request is prepared 1005 and scheduled for execution 1006, guaranteeing its output to secondary storage.

Figure 10:
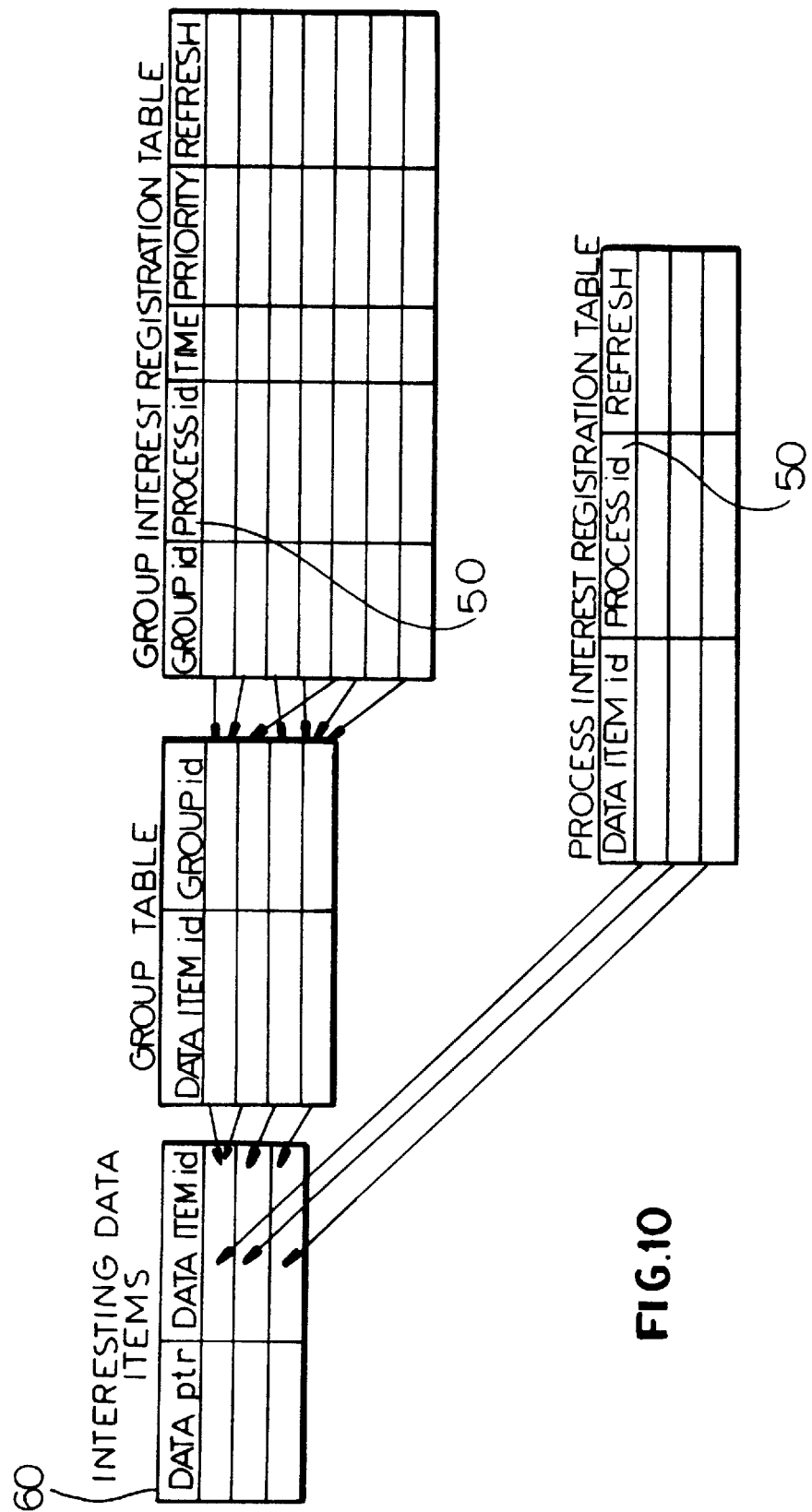
FIG. 10 is a diagram illustrating how interest registrations are grouped and how they are related to data items.

FIG. 10 depicts the table structure that is created in the RSF database to represent interest registrations. This table structure contains the information needed for the selection of the computers that will receive the cross notification message and for the decision about the content of this cross notification message (whether a simple notification or a refresh message will be created).

The process id column 50 contains the computer id and the internal identification of the process in the computer, a combination that makes this value unique in the whole environment. The Data ptr column 60 points to the data of the data items in the RSF. The process interest registration table is there to improve the performance of the invalidation process for interest registrations that are not grouped.

Figure 11:
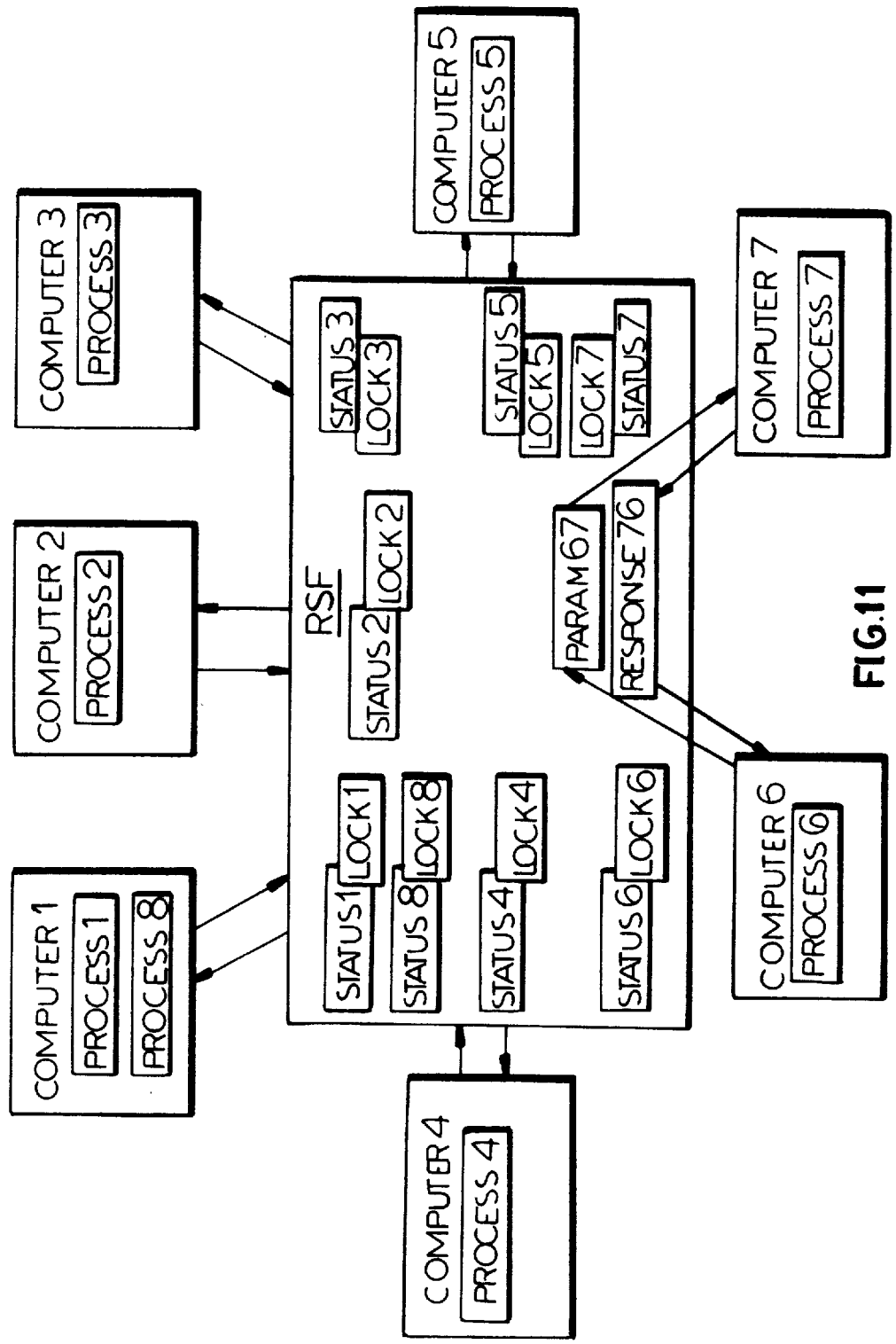
FIG. 11 is a diagram illustrating possible implementation of remote procedure calls and coordinated process groups.

FIG. 11 illustrates a possible implementation of remote procedure calls and coordinated process groups (CPGs). All the processes in this figure participate in a CPG. Every process in the CPG may maintain a data item in the RSF. This data item reflects application specific status details. In addition, every process gains exclusive control of a global lock that, as long as it is exclusively possessed, tells the other members of the group that the process lives.

When this global lock becomes free, the processes that were interested in the life of the corresponding process may infer its death and react accordingly.

(Other implementations of the RSF may send specific process death notifications to all the members of the CPG, avoiding the need for a lock).

Process 6 calls a procedure of process 7 by updating a common data item (Param 67 in which process 7 registered interest. Response 76 is used in the same way but in the opposite direction for returning results from the called procedure.

Figure 12A:
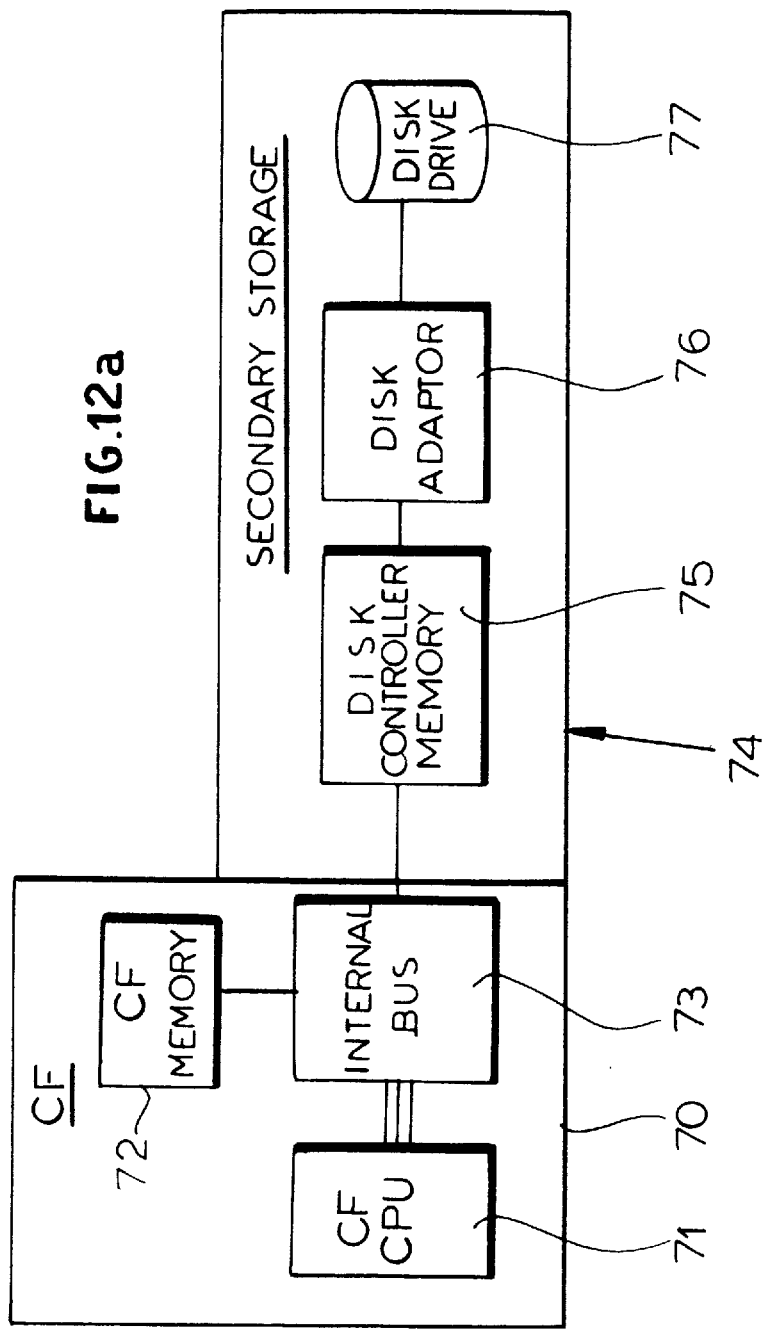
FIG. 12a is a block diagram showing how the functionality of the resource sharing facility can be achieved by enhancement of a coupling facility as in the case of FIGS. 1, 3a and 4a with appropriate hardware and software.
Figure 12B:
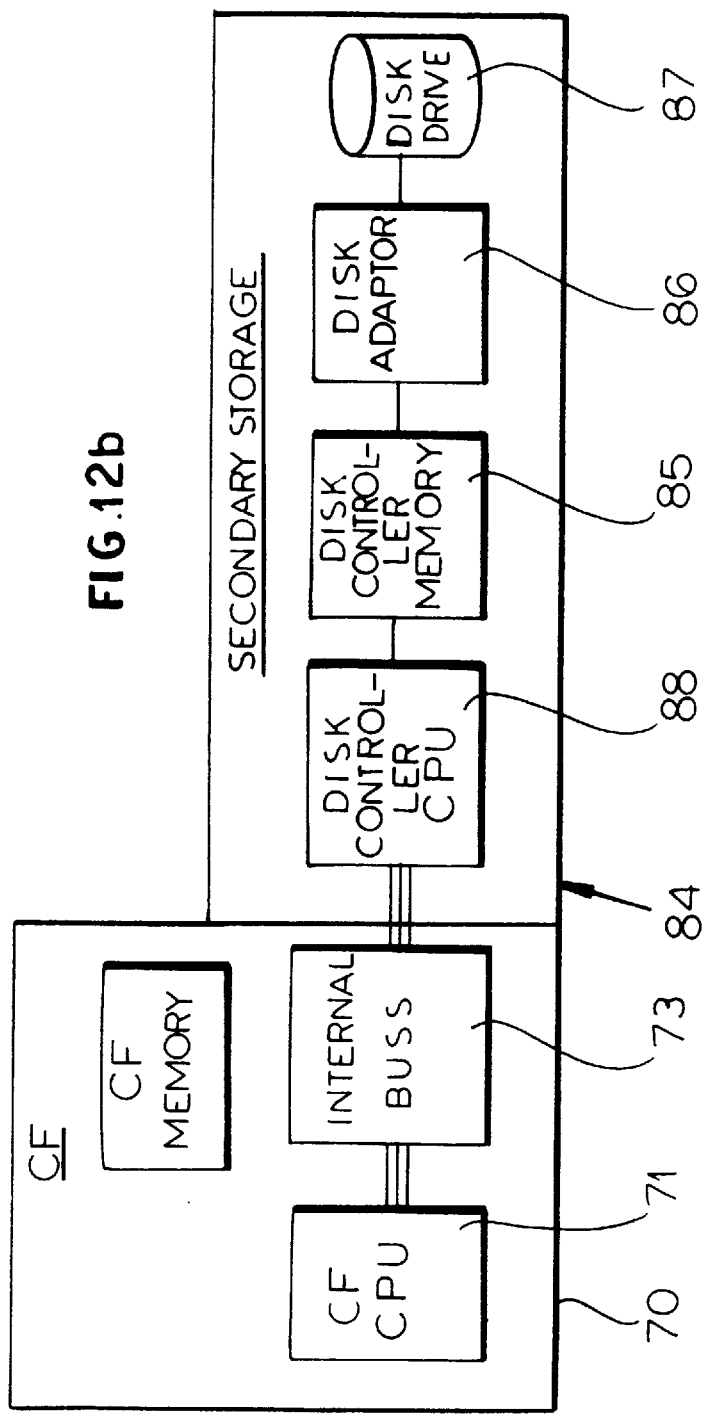
FIG. 12b is a diagram of another such enhancement system.

As has previously been noted, the resource sharing facility may itself be an enhanced coupling facility of the type referred to earlier, the enhancement involving both hardware and software. This can be achieved by replacing the internal bus of the coupling facility with one that is able to communicate with secondary storage controller cache and concurrently replacing the software of the coupling facility by an implementation of the RSF algorithm as previously described with each I/O operation performed via the internal bus. In FIG. 12a, for example, the coupling facility 70 comprises the usual CPU 71 and memory 72 as well as the internal bus 73 which can be connected to the secondary storage controller 74. In this case the internal bus is connected to a disk controller memory 75 directly, the disk controller memory being connected in turn to a disk adapter 76 and the disk drive 77. In the embodiment of FIG. 12b, however, the internal bus of the coupling facility 70 is connected the CPU 88 of the secondary storage controller 84 and the disk controller memory 85 is then connected to the disk controller CPU, the disk adapter 86 and the disk drive 87.

In both cases, when an I/O operation is to be performed this request is communicated to the secondary storage for asynchronous execution through the internal bus. The internal bus is also used by the secondary storage controller in order to respond to the i/O request and bring the requested data into the memory of the coupling facility which has been modified in the manner described.

Figure 13:
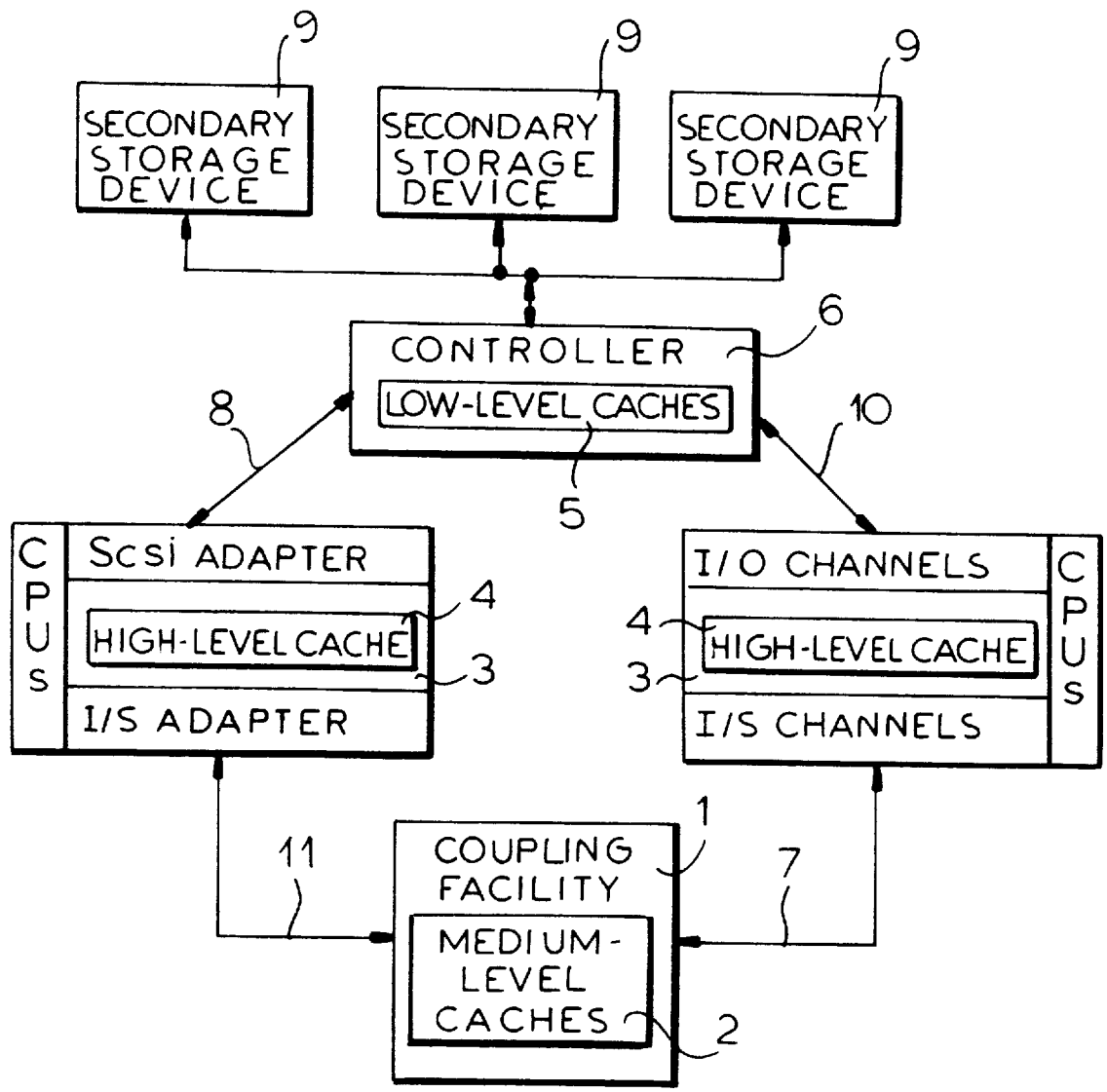
FIG. 13 is a block diagram of another system using a controller of the type described in our copending application 08/579,721 filed 2 Dec. 1995.

FIG. 13 is equivalent to FIG. 1 except for the fact that in this embodiment, heterogeneous computers are connected both to the secondary storage controller 6 and the Coupling Facility 1. This figure relies on a controller of the type described in our copending application Ser. No. 08/579,721 filed 28 December 1995 that supports sharing data between heterogeneous computer systems. The coupling facility 1 in this figure has been enhanced to support connection from heterogeneous computer systems but if extensions of the CF (or even the CF in its current version) evolve to support LAN or some other network connections, these connections may be used to replace the I/S links 11.

Heterogeneous computers in this configuration may use the Coupling Facility inter alia in order to lock shared data permanently residing in secondary storage against concurrent read or write, achieving fully operational simultaneous data manipulation.

Figure 14:
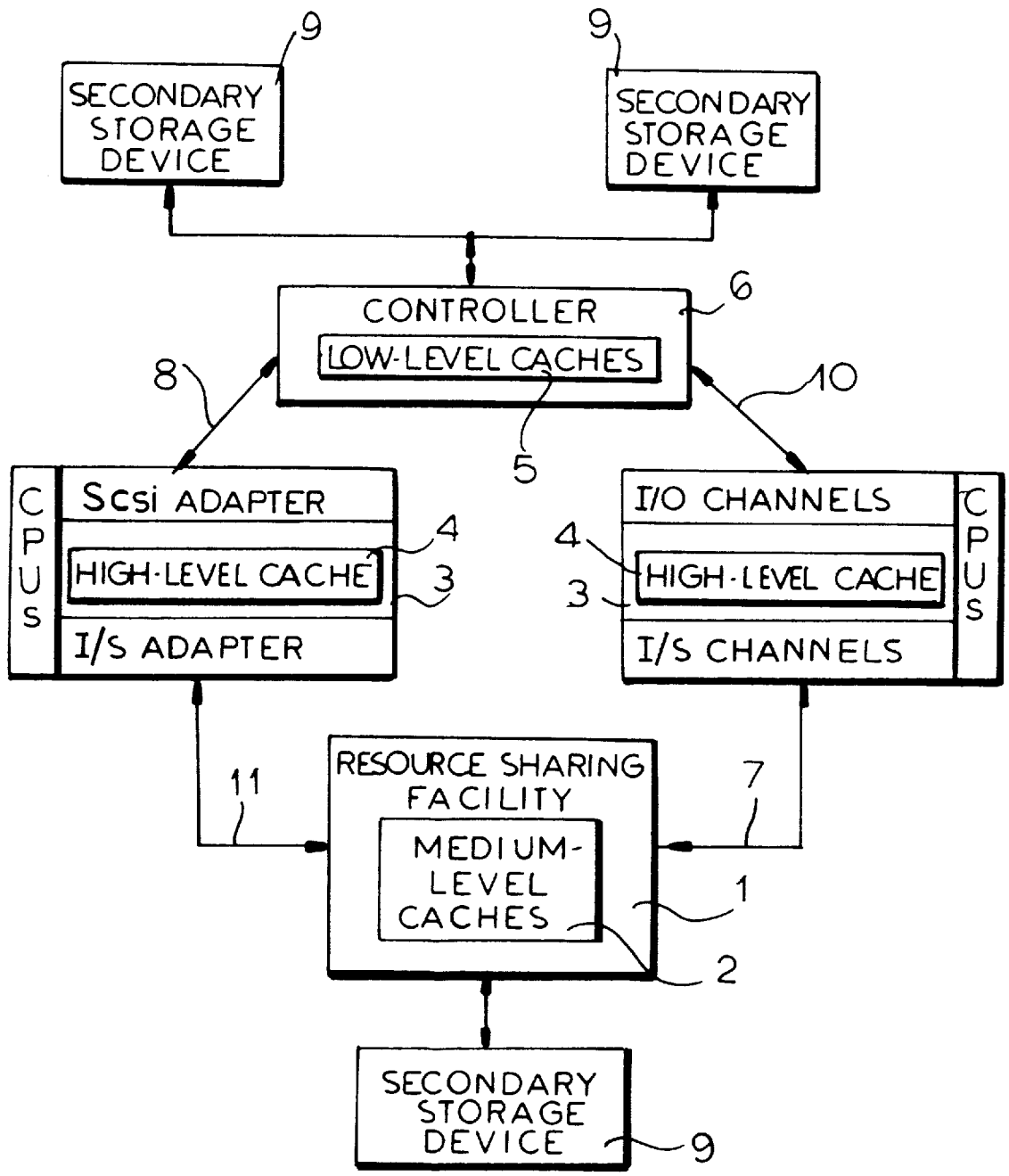
FIG. 14 is a diagram of a modification of this latter arrangement.

In FIG. 14 the CF of FIG. 13 has been replaced by an RSF using the principles described.

In the resulting configuration shared data can reside on the RSF or on the controller of our copending application Ser. No. 08/579,721 filed 28 December 1995 and the RSF supports inter alia the locking for its concurrent manipulation in both cases but not the delegation to the RSF, of I/O operations for data residing on the controller of our copending application Ser. No. 08/579,721 filed 28 December 1995.

For the purpose of this description, a reference to a heterogeneous computer system controller will mean a secondary controller as described in the copending application Ser. No. 08/579,721 which is hereby incorporated by reference in its entirety.

We claim:

1. A method of sharing data items and locks and of supporting remote procedure calls and coordinated process groups between a plurality of computers each having one or more respective central processing units, respective main storage associated with the central processing units of each computer and respective high-level caches maintained in the main storage of the respective computer, said method comprising the steps of:

(a) providing a resource sharing facility with a medium level cache and a resource sharing facility database and capable of selectively storing a set of data items in said medium level cache and in said resource sharing facility database;

(b) connecting said resource sharing facility to all of said computers by intersystem links so that said resource sharing facility is accessible to all of said computers;

(c) operating said resource sharing facility as a controller for at least one secondary storage;

(d) maintaining in said resource sharing facility control information and logic needed for mapping medium level cache data to said secondary storage and [said] secondary storage data to said medium level cache for each data item in said medium level cache where said resource sharing facility optionally unifies redundant control information for said computers; and (e) synchronizing, when required, cache data maintained in the resource sharing facility and persistent data residing in said secondary storage by delegating input/output operations from said computer to said resource sharing facility.

2. The method defined in claim 1 wherein said resource sharing facility database is managed by a resource sharing facility database management system implemented directly in the resource sharing facility and operated for maintenance and use of queues needed for online transaction processing and batch job execution.

3. The method defined in claim 1, further comprising the step of supporting shared database journal files in the resource sharing facility.

4. The method defined in claim 1, further comprising the step of effecting transaction and job load balancing operations using the resource sharing facility for sharing computer independent session context data and job context data.

5. The method defined in claim 1, further comprising the step of implementing management of said resource sharing facility database by a resource sharing facility database management system in at least one of said computers.

6. The method defined in claim 5 wherein data maintained by said resource sharing facility database management system is stored in said main storage of said one of said computers and is not shared between said computers.

7. The method defined in claim 1 wherein the shared data items are selected from:

structured data of a database management system data set, structured data of a nondatabase management system data set, and unstructured data items.

8. The method defined in claim 7 wherein said structured data is selected from the group which consists of:

data of an MVS DB2 database, data of an IMS database, data of an ADABAS database, data of a VSAM file, data of a DB2/6000 database, data of an Oracle database, data of a Sybase database, data of an Informix database, data of an Ingres database, data of a Microsoft® SQL server database, data of an SQL/DS database, data of a CA-IDMS database, data of a DataCom/DB database, data of IAM files, and data managed by any other DBMS.

9. The method defined in claim 1 wherein said computers are selected from the group which consists of IBM® mainframes and compatible, UNIX machines, NT machines, PCs and compatibles or any other type of computer and combinations thereof.

10. The method defined in claim 1, further comprising the steps of:

reading data items from said medium-level cache with a read request; and locking data items read from said medium-level cache against concurrent update or read in the medium-level cache, with the same read request.

11. The method defined in claim 1 wherein at least some of the computers are heterogeneous and are connected to a heterogeneous computer system secondary storage controller and wherein some shared data resides in said heterogeneous computer system secondary storage controller which is used to read and write but not lock said some shared data and where mapping between the portion of said some shared data which is kept also in the medium level cache and its permanent copy in secondary storage of the heterogeneous computer system secondary storage controller is not delegated to said resource sharing facility.

12. A method of sharing data items and locks and of supporting remote procedure calls and coordinated process groups between a plurality of computers each having one or more respective central processing units, respective main storage associated with the central processing units of each computer and respective high-level caches maintained in the main storage of the respective computer, said method comprising the steps of:

(a) providing a resource sharing facility with a medium level cache and a resource sharing facility database and capable of selectively storing a set of data items in said medium level cache and in said resource sharing facility database;

(b) connecting said resource sharing facility to all of said computers by intersystem links so that said resource sharing facility is accessible to all of said computers;

(c) operating said resource sharing facility as a controller for at least one secondary storage;

(d) maintaining in said resource sharing facility control information and logic needed for mapping medium level cache data to said secondary storage and secondary storage data to said medium level cache for each data item in said medium level cache where said resource sharing facility optionally unifies redundant control information for said computers; and (e) synchronizing when required, cache data maintained in the resource sharing facility and persistent data residing in said secondary storage by delegating input/output operations from said computer to said resource sharing facility;

(f) activating in said resource sharing facility a set of processes in response to at least one request from a respective program running in a respective computer; and (g) supporting in each process of said set requests from any of said computers to write a data item in said medium-level cache, to register interest in a data item, to write a data item to secondary storage, to read a data item from said medium-level cache to a given location in the main storage of the requesting computer, to lock a data item against update or read by other programs, to unlock a lock, to perform regular I/O operations, and to perform any combination of the above requests as a single operation.

13. The method defined in claim 12, further comprising the step of providing each of said computers with a resource sharing facility support facility having a cache buffer control vector in the respective main storage with entries describing states of data items in buffers of the respective high-level cache, each of said requests to register interest in a data item associating a respective one of said entries of a respective cache buffer control vector with a corresponding data item in said medium-level cache. computers and is not shared between said computers.

14. The method defined in claim 13, further comprising the step of periodically transmitting a heartbeat message from each of said resource sharing facility support facilities to said resource sharing facility to signal that a respective computer remains active and connected to the resource sharing facility by a respective intersystem link.

15. The method defined in claim 12, further comprising the step of, upon each writing of any data item from one of said computers into said medium-level cache by a write request, invalidating or refreshing corresponding copies of the same data item in all of said high-level caches of all of said computers that have registered interest in that data item except for the computer which has issued the write request.

16. The method defined in claim 12, further comprising the step of, upon each writing of any data item from one of said computers into said secondary storage by issuance of a write request, optionally writing a copy of the data item in said medium-level cache and invalidating and refreshing copies of said data item in all of said high-level caches of all of said computers that have registered interest in that data item except for the computer which has issued the write request.

17. The method defined in claim 12 wherein the shared data items are selected from:

structured data of a database management system data set, structured data of a nondatabase management system data set, and unstructured data items.

18. The method defined in claim 17 wherein said structured data is selected from the group which consists of:

data of an MVS DB2 database, data of an IMS database, data of an ADABAS database, date of a VSAM file, data of a DB2/6000 database, data of an Oracle database, data of a Sybase database, data of an Informix database, data of an Ingres database, data of a Microsoft® SQL server database, data of an SQL/DS database, data of a CA-IDMS database, data of a DataCom/DB database, data of IAM files, and data managed by any other DBMS.

19. The method defined in claim 12 wherein said resource sharing facility database is implemented by a management system directly in the resource sharing facility and is operated for maintenance and use of queues needed for online transaction processing and batch job execution.

20. The method defined in claim 12, further comprising the step of supporting shared database journal files in the resource sharing facility.

21. The method defined in claim 12, further comprising the step of effecting transaction and job load balancing operations using the resource sharing facility for sharing computer independent session context data and job context data.

22. The method defined in claim 12, further comprising the step of implementing a management system for resource sharing facility database in at least one of said computers.

23. The method defined in claim 22 wherein data maintained by said resource sharing facility database management system is stored in said main storage of said one of said computers and is not shared between said computers.

24. The method defined in claim 12, further comprising the steps of:

generating a cross-notification message selectively invalidating a respective high-level cache, refreshing a respective high-level cache and announcing a change in status of a data item associated with the respective high-level cache, by said resource sharing facility upon a change to any data item in said medium-level cache; and sending said cross-notification message to at least some of said computers that have registered an interest in the respective data item.

25. The method defined in claim 24, further comprising the step of:

posting with the cross-notification message an event control block that has previously been created by the interest registration, in the computer that receives the message.

26. The method defined in claim 12 wherein said computers are selected from the group which consists of IBM® mainframes and compatible, UNIX machines, NT machines, PCs and compatibles or any other type of computer and combinations thereof.

27. The method defined in claim 12, further comprising the steps of:

reading data items from said medium-level cache with a read request; and locking data items read from said medium-level cache against concurrent update or read in the medium-level cache, with the same read request.

28. The method defined in claim 12 wherein at least some of the computers are heterogeneous and are connected to a heterogeneous computer system secondary storage controller and wherein some shared data resides in said heterogeneous computer system secondary controller which is used to read and write but not lock said some shared data and where mapping between the portion of said some shared data which is kept also in the medium level cache and its permanent copy in secondary storage of the heterogeneous computer system secondary controller is not delegated to said resource sharing facility.

29. A computer system capable of sharing data items and locks and of supporting remote procedure calls and coordinated process groups, comprising:

a plurality of computers each having one or more central processing units, respective main storage associated with the central processing unit or units of each computer and respective high-level caches maintained in the main storage of the respective computer;

a resource sharing facility with a medium level cache and a resource sharing facility database and capable of selectively storing a set of data items in said medium level cache and in said resource sharing facility database; and high-speed intersystem links connecting said resource sharing facility to all of said computers so that said resource sharing facility is accessible to all of said computers, said resource sharing facility being provided as a controller for at least one secondary storage, said resource sharing facility being provided with control information and logic needed for mapping medium level cache data to said secondary storage and secondary storage data to said medium level cache for each data item in said medium level cache, cache data maintained in the resource sharing facility and persistent data residing in said secondary storage being synchronized by delegation of input/output operations from the computer to the resource sharing facility.

30. The computer system defined in claim 29, further comprising zero or more coupling facilities with medium level cache that is connected to at least two of said computers in addition to one or more of said resource sharing facilities.

31. The computer system defined in claim 29 wherein at least some of said computers are heterogeneous and are connected to a heterogeneous computer system secondary storage controller and wherein some shared data resides in said heterogeneous computer system secondary storage controller which is used to read and write but not lock said some shared data and where mapping between the portion of said some shared data which is kept also in the medium level cache and its permanent copy in secondary storage of the heterogeneous computer system secondary storage controller is not delegated to said resource sharing facility.

* * * * *